United States Patent
Sikka et al.

(10) Patent No.: US 11,681,982 B2
(45) Date of Patent: Jun. 20, 2023

(54) AUTOMATED GUIDED VEHICLE CONTROL AND ORGANIZING INVENTORY ITEMS USING STOCK KEEPING UNIT CLUSTERS

(71) Applicant: Staples, Inc., Framingham, MA (US)

(72) Inventors: Sandeep Sikka, Natick, MA (US);
Nitin Verma, Natick, MA (US);
Michael Bhaskaran, Sherborn, MA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 17/357,996

(22) Filed: Jun. 25, 2021

(65) Prior Publication Data
US 2021/0319393 A1    Oct. 14, 2021

Related U.S. Application Data

(62) Division of application No. 16/024,744, filed on Jun. 30, 2018, now Pat. No. 11,049,065.

(51) Int. Cl.
*G06Q 10/087* (2023.01)

(52) U.S. Cl.
CPC .................. *G06Q 10/087* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 5,134,291 A | | 7/1992 | Ruhl et al. |
| 6,289,260 B1 * | | 9/2001 | Bradley ............... B65G 1/1376 414/280 |
| 8,024,054 B2 | | 9/2011 | Mairs et al. |
| 8,024,064 B1 | | 9/2011 | Sanghavi et al. |
| 8,090,712 B2 | | 1/2012 | Shellshear |
| 8,965,562 B1 | | 2/2015 | Wurman et al. |
| 9,111,251 B1 | | 8/2015 | Brazeau |
| 9,120,622 B1 * | | 9/2015 | Elazary .................. B25J 9/1697 |
| 9,452,883 B1 | | 9/2016 | Wurman et al. |
| 9,965,730 B2 | | 5/2018 | Hance et al. |

(Continued)

OTHER PUBLICATIONS

Wutthisirisart, Phichet. Relation-based item slotting. University of Missouri-Columbia, 2010. (Year: 2010).*

(Continued)

*Primary Examiner* — Nathan A Mitchell
(74) *Attorney, Agent, or Firm* — VLP Law Group LLP; Michel Bohn

(57) ABSTRACT

A method determines a processing cluster including one or more stock keeping units (SKUs); divides the processing cluster into a first cluster and a second cluster based on SKU affinities between the one or more SKUs in the processing cluster; determines a first SKU of the first cluster to be replicated to the second cluster based on a demand correlation between the first SKU of the first cluster and a second SKU of the second cluster; replicates the first SKU of the first cluster to the second cluster; responsive to replicating the first SKU of the first cluster to the second cluster, determines whether the first cluster and the second cluster satisfy a defined constraint; and responsive to determining that the first cluster and the second cluster satisfy the defined constraint, assigns the first cluster to a first physical location and assigning the second cluster to a second physical location.

20 Claims, 18 Drawing Sheets

(56) References Cited

U.S. PATENT DOCUMENTS

| | | | | |
|---|---|---|---|---|
| 10,427,873 | B1* | 10/2019 | Mause | B65G 1/1378 |
| 10,504,055 | B2 | 12/2019 | Hance et al. | |
| 10,650,344 | B2 | 5/2020 | Qin | |
| 10,796,278 | B1 | 10/2020 | Wintz et al. | |
| 2002/0143669 | A1* | 10/2002 | Scheer | G06Q 20/203 |
| | | | | 705/28 |
| 2007/0017984 | A1* | 1/2007 | Mountz | G06Q 10/087 |
| | | | | 235/385 |
| 2007/0094101 | A1 | 4/2007 | Breitling | |
| 2008/0071418 | A1* | 3/2008 | Antony | G06Q 10/087 |
| | | | | 700/214 |
| 2009/0082902 | A1* | 3/2009 | Foltz | G06Q 10/087 |
| | | | | 700/214 |
| 2009/0216364 | A1* | 8/2009 | Grissom | G06Q 10/087 |
| | | | | 700/214 |
| 2013/0197869 | A1 | 8/2013 | Fritz et al. | |
| 2013/0226649 | A1* | 8/2013 | Grissom | G06Q 10/06315 |
| | | | | 705/7.25 |
| 2013/0338819 | A1* | 12/2013 | Max | B65G 1/137 |
| | | | | 700/216 |
| 2015/0073587 | A1 | 3/2015 | Vliet et al. | |
| 2015/0161545 | A1* | 6/2015 | Willemain | G06Q 10/087 |
| | | | | 705/7.25 |
| 2015/0291356 | A1* | 10/2015 | Oki | B65G 1/137 |
| | | | | 414/807 |
| 2015/0314331 | A1 | 11/2015 | Thorsson | |
| 2016/0042314 | A1 | 2/2016 | Mountz et al. | |
| 2016/0060032 | A1 | 3/2016 | Kim et al. | |
| 2017/0091704 | A1 | 3/2017 | Wolf et al. | |
| 2017/0315918 | A1* | 11/2017 | Nikitaki | G06F 16/9574 |
| 2017/0330259 | A1* | 11/2017 | Deshpande | G06Q 30/0639 |
| 2018/0005173 | A1 | 1/2018 | Elazary et al. | |
| 2018/0060764 | A1 | 3/2018 | Hance et al. | |
| 2018/0060765 | A1 | 3/2018 | Hance et al. | |
| 2018/0068255 | A1 | 3/2018 | Hance et al. | |
| 2018/0127211 | A1* | 5/2018 | Jarvis | B65G 1/1373 |
| 2018/0251300 | A1* | 9/2018 | Kapuria | G06Q 10/08 |
| 2018/0253680 | A1* | 9/2018 | Jahani | G06Q 30/0633 |
| 2018/0319590 | A1 | 11/2018 | Lindbo et al. | |
| 2019/0138978 | A1* | 5/2019 | Johnson | G06Q 10/087 |
| 2019/0259043 | A1 | 8/2019 | Koneri et al. | |
| 2019/0266552 | A1* | 8/2019 | Gupta | G06Q 10/087 |
| 2019/0272491 | A1* | 9/2019 | Das | G06Q 10/06313 |
| 2019/0347607 | A1* | 11/2019 | Shi | G06N 3/0481 |
| 2019/0378232 | A1* | 12/2019 | Goren | G06Q 50/28 |

OTHER PUBLICATIONS

Kim et al. "Slotting methodology using correlated improvement for a zone-based carton picking distribution system". Computers & Industrial Engineering, vol. 62, Issue 1, pp. 286-295. 2012. (Year: 2012).*

M. Kofler et al. "Re-warehousing vs. healing: Strategies for warehouse storage location assignment," 3rd IEEE International Symposium on Logistics and Industrial Informatics, 2011, pp. 77-82. (Year: 2011).*

Egas, Carl and Masel, Dale, "Determining Warehouse Storage Location Assignments Using Clustering Analysis" (2010). 11th IMHRC Proceedings (Milwaukee, Wisconsin. USA—2010). (Year: 2010).*

Aljalbout, et al. Clustering with Deep Learning: Taxonomy and New Methods, Computer Vision Group, Technical University of Munich, Sep. 17, 2018, https://arxiv.org/pdf/1801.07648.pdf, 12 pages.

Bartholdi, III et al., Warehouse and Distribution Science. The Supply Chain and Logistics Institute, School of Industrial and Systems Engineering, Georgia Institute of Technology, Revised Aug. 19, 2014, https://www2.isye.gatech.edu/~jjb/wh/book/editions/wh-sci-0.96.pdf, 323 pgs.

Decisioncraft Inc., Warehouse Activity ProFiling and Order Picking Productivity, Issue No. 06/07/01, Accessed May 14, 2018, http://www.decisioncraft.com/dmdirect/warehouse_profiling.htm, 2 pages.

Egas, et al. Determining Warehouse Storage Location Assignments Using Clustering Analysis. Ohio University: Department of Industrial and Systems Engineering. (2010) pp. 1-7. https://digitalcommons.georgiasouthem.edu/pmhr_2010/19.

Han et al. Data mining: Concepts and techniques (3rd ed., Morgan Kaufmann series in data management systems), Burlington, Mass.: Elsevier. 2012 (pp. 487-568), Retreived from: https://www.scribd.com/document/339025636/Cluster-Analysis-pdf.

Kim, Byung Soo, et al., Slotting methodology using correlated improvement for a zone-based carton picking distribution system, Computers & Industrial Engineering, vol. 62, Issue 1, 2012, pp. 286-295. (Year: 2012).

Li, Yingde, et al., Dynamic Slotting Optimization Based on SKUs Correlations in a Zone-based Wave-picking System, 2012, 12th IMHRC Proceedings (Gardanne, France—2012.

Matthews, J. & Visagie, S. E. 2015. SKU assignment to unidirectional picking lines using correlations Orion, 31(2):61-76, doi: 10.5784/31-2-531. (Year: 2015).

Park, et al., Algorithms for Generalized Cluster-wise Linear Regression. (May 17, 2016), https://arxiv.org/pdf/1607.01417.pdf, 29 pages.

Seward, Optimal Picer Routing; How Zalando Accelerates Warehouse Operations with Neural Networks, Slides. Dataconomy Media: Data and Analytics, Jan. 2016 https://www.slideshare.net/Dataconomy/how-zalando-accelerates-warehouse-operations-with-neural-networks-calvin-seward-data-scientist-at-zalando, 29 pgs.

Wikipedia, Loss Functions for Classification, Wikimedia Foundation, Apr. 25, 2018, https://en.wikipedia.org/wiki/Loss_functions_for_classification, 6 pages.

Yun et al., An Efficient Clustering Algorithm for Market Basket Data Based on Small Large Ratios. Department of Electrical Engineering, National Taiwan University, Proceedings: COMPSAC, the IEEE Computer Society's International Computer Software & Applications (Jan. 1, 2001), pp. 505-510. http://arbor.ee.ntu.edu.tw/~mschen/paperps/compsac150.pdf.

Chan, F., et al., Improving the productivity of order picking of a manual-pick and multi-level rack distribution warehouse through the implementation of class-based storage, Expert Systems with Applications. vol. 38, Issue 3, Mar. 2011, pp. 2686-2700.

Hoshino et al. Highly efficient AGV transportation system management using agent cooperation and container storage planning, 2005 IEEE/RSJ International Conference on Intelligent Robots and Systems, Edmonton, Alta., 2005, pp. 1588-1593.

Kovacs, A., Optimizing the storage assignment in a warehouse served by milkrun logistics, Int. J. Production Economics 133 (2011) 312-318. Available online Feb. 1, 2010.

Le-Duc et al. Travel distance estimation and storage zone optimization in a 2-block class-based storage strategy warehouse, pp. 3561-3581, Received Nov. 1, 2004, Published online: Feb. 22, 2007.

Roodbergen, Kees Jan, and Iris FA Vis "A survey of literature on automated storage and retrieval systems." European journal of operational research 194.2 (2009): 343-362. (Year: 2009).

\* cited by examiner

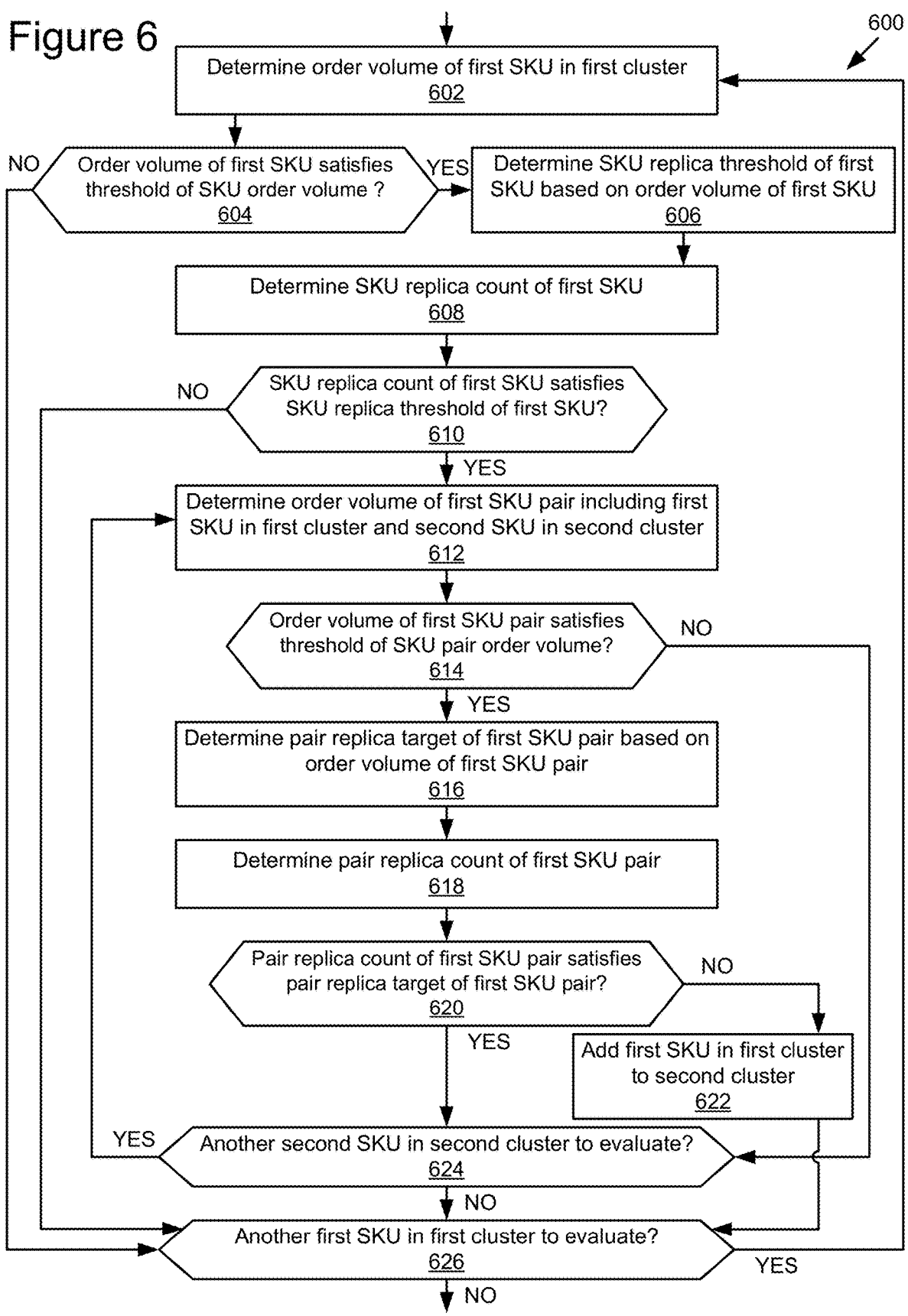

AUTOMATED GUIDED VEHICLE CONTROL AND ORGANIZING INVENTORY ITEMS USING STOCK KEEPING UNIT CLUSTERS

BACKGROUND

The present disclosure relates to controlling automated guided vehicles (AGV) and organizing inventory items in a storage facility. In some instances, the present disclosure relates to controlling AGVs and organizing inventory items in the storage facility using clusters of items.

Some storage facilities store groups of items represented by SKUs proximate to one another in storage area, but existing models for grouping items are inefficient and inaccurate due to the massive number of items to be grouped. In addition, existing models may generate groups at a single level, so that the arrangement of the items in the storage area based on the groups requires multiple stops to retrieve various requested items, especially when groups of items are stored in multiple aisles, racks, or shelves, etc. Further, existing models typically only allocate an item to an individual group, so that it is stored in a single storage location within a storage area, which may result in inefficiency in retrieving that item, especially when fulfilling simultaneous orders containing the item. These issues are compounded when a limited number of AGVs are used to retrieve items, because they cause more fuel, computing resources, and time to be consumed by the AGVs.

SUMMARY

According to one innovative aspect of the subject matter described in this disclosure, a computer-implemented method comprises: determining a processing cluster including one or more SKUs; dividing the processing cluster into a first cluster and a second cluster based on SKU affinities between the one or more SKUs in the processing cluster; determining a first SKU of the first cluster to be replicated to the second cluster based on a demand correlation between the first SKU of the first cluster and a second SKU of the second cluster; replicating the first SKU of the first cluster to the second cluster; responsive to replicating the first SKU of the first cluster to the second cluster, determining whether the first cluster and the second cluster satisfy a defined constraint; and responsive to determining that the first cluster and the second cluster satisfy the defined constraint, assigning the first cluster to a first physical location and assigning the second cluster to a second physical location.

In general, another innovative aspect of the subject matter described in this disclosure may be embodied in computer-implemented methods comprising: initializing a SKU storing model of a storage facility, the SKU storing model including a first pick-cell station and a second pick-cell station at which one or more customer orders are fulfilled; determining, from SKUs associated with the storage facility, a first set of SKUs based on order volumes of one or more SKUs in the first set of SKUs; dividing the first set of SKUs into a first cluster and a second cluster based on SKU affinities between the one or more SKUs in the first set of SKUs; replicating a first SKU of the first cluster to the second cluster based on a demand correlation between the first SKU of the first cluster and a second SKU of the second cluster; responsive to replicating the first SKU of the first cluster to the second cluster, determining the first cluster to be a first pick-cell cluster and determining the second cluster to be a second pick-cell cluster; and assigning the first pick-cell cluster to the first pick-cell station and assigning the second pick-cell cluster to the second pick-cell station in the SKU storing model.

In general, another innovative aspect of the subject matter described in this disclosure may be embodied in a system that includes one or more processors; one or more memories storing instructions that, when executed by the one or more processors, cause the system to: determine a processing cluster including one or more stock keeping units (SKUs); divide the processing cluster into a first cluster and a second cluster based on SKU affinities between the one or more SKUs in the processing cluster; determine a first SKU of the first cluster to be replicated to the second cluster based on a demand correlation between the first SKU of the first cluster and a second SKU of the second cluster; replicate the first SKU of the first cluster to the second cluster; responsive to replicating the first SKU of the first cluster to the second cluster, determine whether the first cluster and the second cluster satisfy a defined constraint; and responsive to determining that the first cluster and the second cluster satisfy the defined constraint, assign the first cluster to a first physical location and assigning the second cluster to a second physical location.

In general, another innovative aspect of the subject matter described in this disclosure may be embodied in a system that includes one or more processors; one or more memories storing instructions that, when executed by the one or more processors, cause the system to: initialize a SKU storing model of a storage facility, the SKU storing model including a first pick-cell station and a second pick-cell station at which one or more customer orders are fulfilled; determine, from SKUs associated with the storage facility, a first set of SKUs based on order volumes of one or more SKUs in the first set of SKUs; divide the first set of SKUs into a first cluster and a second cluster based on SKU affinities between the one or more SKUs in the first set of SKUs; replicate a first SKU of the first cluster to the second cluster based on a demand correlation between the first SKU of the first cluster and a second SKU of the second cluster; responsive to replicating the first SKU of the first cluster to the second cluster, determine the first cluster to be a first pick-cell cluster and determining the second cluster to be a second pick-cell cluster; and assign the first pick-cell cluster to the first pick-cell station and assigning the second pick-cell cluster to the second pick-cell station in the SKU storing model.

These and other embodiments may each optionally include one or more of the following features, such as: that determining the first SKU of the first cluster to be replicated to the second cluster includes determining an order volume of the first SKU, determining that the order volume of the first SKU satisfies a threshold of SKU order volume, determining an order volume of a first SKU pair, the first SKU pair including the first SKU of the first cluster and the second SKU of the second cluster, and determining that the order volume of the first SKU pair satisfies a threshold of SKU pair order volume; that determining the first SKU of the first cluster to be replicated to the second cluster includes determining an order volume of the first SKU, determining a SKU replica threshold of the first SKU based on the order volume of the first SKU, determining an order volume of a first SKU pair, the first SKU pair including the first SKU of the first cluster and the second SKU of the second cluster, and determining a pair replica target of the first SKU pair based on the order volume of the first SKU pair; that determining the first SKU of the first cluster to be replicated to the second cluster includes determining a SKU replica count of the first SKU, the SKU replica count of the first SKU indicating a number of clusters that contain the first SKU, determining that the SKU replica count of the first SKU satisfies a SKU replica threshold of the first SKU, determining a pair replica count of a first SKU pair, the first SKU pair including the first SKU of the first cluster and the second SKU of the second cluster, the pair replica count of the first SKU pair indicating a number of clusters that contain the first SKU and the second SKU of the first SKU pair, determining that the pair replica count of the first SKU pair is less than a pair replica target of the first SKU pair, and responsive to determining that the SKU replica count of the first SKU satisfies the SKU replica threshold of the first SKU and determining that the pair replica count of the first SKU pair is less than the pair replica target of the first SKU pair, determining to replicate the first SKU of the first cluster to the second cluster; that determining, from SKUs associated with a storage facility, to-be-clustered SKUs based on order volumes of the to-be-clustered SKUs, generating an initial cluster including the to-be-clustered SKUs, initializing a cluster queue, the cluster queue including the initial cluster, and that determining the processing cluster includes determining the processing cluster to be a cluster that occupies a start position of the cluster queue; that determining the processing cluster includes determining the processing cluster to be a cluster that occupies a start position of a cluster queue, and that responsive to determining that the first cluster violates the defined constraint, appending the first cluster to an end position of the cluster queue; that determining whether the first cluster and the second cluster satisfy the defined constraint includes determining that the first cluster satisfies a defined threshold cluster size, and determining that the second cluster satisfies the defined threshold cluster size; that dividing the processing cluster into the first cluster and the second cluster includes determining an isolated SKU in the processing cluster based on one or more first SKU affinities of the isolated SKU, filtering the isolated SKU from the processing cluster, dividing the filtered processing cluster into the first cluster and the second cluster based on the SKU affinities between the one or more SKUs in the filtered processing cluster, and that responsive to replicating the first SKU of the first cluster to the second cluster, computing a first attachment score between the isolated SKU and the first cluster and a second attachment score between the isolated SKU and the second cluster, and assigning the isolated SKU to one of the first cluster and the second cluster based on the first attachment score between the isolated SKU and the first cluster and the second attachment score between the isolated SKU and the second cluster; that determining the isolated SKU in the processing cluster includes determining the one or more first SKU affinities between the isolated SKU in the processing cluster and one or more other SKUs in the processing cluster, and determining that the one or more first SKU affinities between the isolated SKU and the one or more other SKUs satisfy a defined threshold SKU affinity; that computing the first attachment score between the isolated SKU and the first cluster includes determining order volumes of one or more SKU pairs, each SKU pair including the isolated SKU and a SKU in the first cluster, and computing the first attachment score between the isolated SKU and the first cluster based on the order volumes of the one or more SKU pairs; that the processing cluster excludes a non-clustering SKU, and that determining, from SKUs associated with a storage facility, the non-clustering SKU based on an order volume of the non-clustering SKU, responsive to determining that the first cluster and the second cluster satisfy the defined constraint, computing a first attachment score between the non-clustering SKU and the first cluster and a second attachment score between the non-clustering SKU and the second cluster, and assigning the non-clustering SKU to one of the first cluster and the second cluster based on the first attachment score between the non-clustering SKU and the first cluster and the second attachment score between the non-clustering SKU and the second cluster.

These and other embodiments may each optionally include one or more of the following features, such as: that receiving a customer order, determining a first matching score between the customer order and the first pick-cell cluster of the first pick-cell station, determining a second matching score between the customer order and the second pick-cell cluster of the second pick-cell station, selecting, from the first pick-cell station and the second pick-cell station, a target pick-cell station based on the first matching score and the second matching score, and assigning the customer order to the target pick-cell station to fulfill the customer order; that the SKU storing model includes one or more storage aisles, and that clustering the SKUs associated with the storage facility into one or more aisle clusters, and assigning an aisle cluster to a corresponding storage aisle in the SKU storing model based on the aisle cluster, the first pick-cell cluster, and the second pick-cell cluster; that assigning the aisle cluster to the corresponding storage aisle in the SKU storing model includes determining a matching score between the aisle cluster and the first pick-cell cluster, determining that the matching score between the aisle cluster and the first pick-cell cluster satisfies a defined threshold matching score, responsive to determining that the matching score between the aisle cluster and the first pick-cell cluster satisfies the defined threshold matching score, determining the corresponding storage aisle from the one or more storage aisles based on a relative distance between the corresponding storage aisle and the first pick-cell station, and assigning the aisle cluster to the corresponding storage aisle in the SKU storing model; that the corresponding storage aisle includes one or more rack units, and that clustering SKUs of the aisle cluster into one or more rack clusters, and assigning a rack cluster to a corresponding rack unit of the corresponding storage aisle in the SKU storing model; that assigning the rack cluster to the corresponding rack unit of the corresponding storage aisle in the SKU storing model includes determining a demand score for each rack cluster based on SKU velocities of SKUs in the rack cluster, ranking the one or more rack clusters based on the demand scores of the one or more rack clusters, and assigning the one or more rack clusters to the one or more rack units of the corresponding storage aisle based on ranking orders of the one or more rack clusters; that the corresponding rack unit of the corresponding storage aisle includes one or more mini-pallets, and that clustering SKUs of the rack cluster into one or more mini-pallet clusters, and assigning a mini-pallet cluster to a corresponding mini-pallet of the corresponding rack unit in the SKU storing model; that the SKU storing model includes a first storage aisle associated with a first aisle cluster and a second storage aisle associated with a second aisle cluster, and that assigning a first customer order to the first pick-cell station, the first customer order including one or more first ordered SKUs, assigning a second customer order to the first pick-cell station, the second customer order including one or more second ordered SKUs, generating a SKU fulfillment set for the first pick-cell station, the SKU fulfillment set including the one or more first ordered SKUs of the first customer order and the one or more second ordered SKUs of the second customer order, determining a first matching score between the SKU fulfillment set and the first aisle cluster of the first storage aisle, determining a second matching score between the SKU fulfillment set and the second aisle cluster of the second storage aisle, selecting, from the first storage aisle and the second storage aisle, a target storage aisle based on the first matching score and the second matching score, generating a picking task associated with the target storage aisle, the picking task specifying the target storage aisle, the first pick-cell station, and a SKU picking list, and instructing a picking-automated guided vehicle (picking-AGV) to perform the picking task; that determining a first picking workload of the first storage aisle, determining a second picking workload of the second storage aisle, and that selecting the target storage aisle includes selecting, from the first storage aisle and the second storage aisle, the target storage aisle based on the first picking workload of the first storage aisle and the second picking workload of the second storage aisle; that determining one or more matching SKUs between the SKU picking list and a first rack cluster of a first rack unit in the target storage aisle, determining one or more target mini-pallets in the first rack unit, the one or more target mini-pallets storing the one or more matching SKUs, instructing the picking-AGV to stop at a stop position associated with the first rack unit, and instructing the picking-AGV to retrieve the one or more target mini-pallets storing the one or more matching SKUs from the first rack unit during a stop at the stop position.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 6 is a flowchart of an example method for selectively replicating a SKU across multiple clusters.

DESCRIPTION

Figure 1:
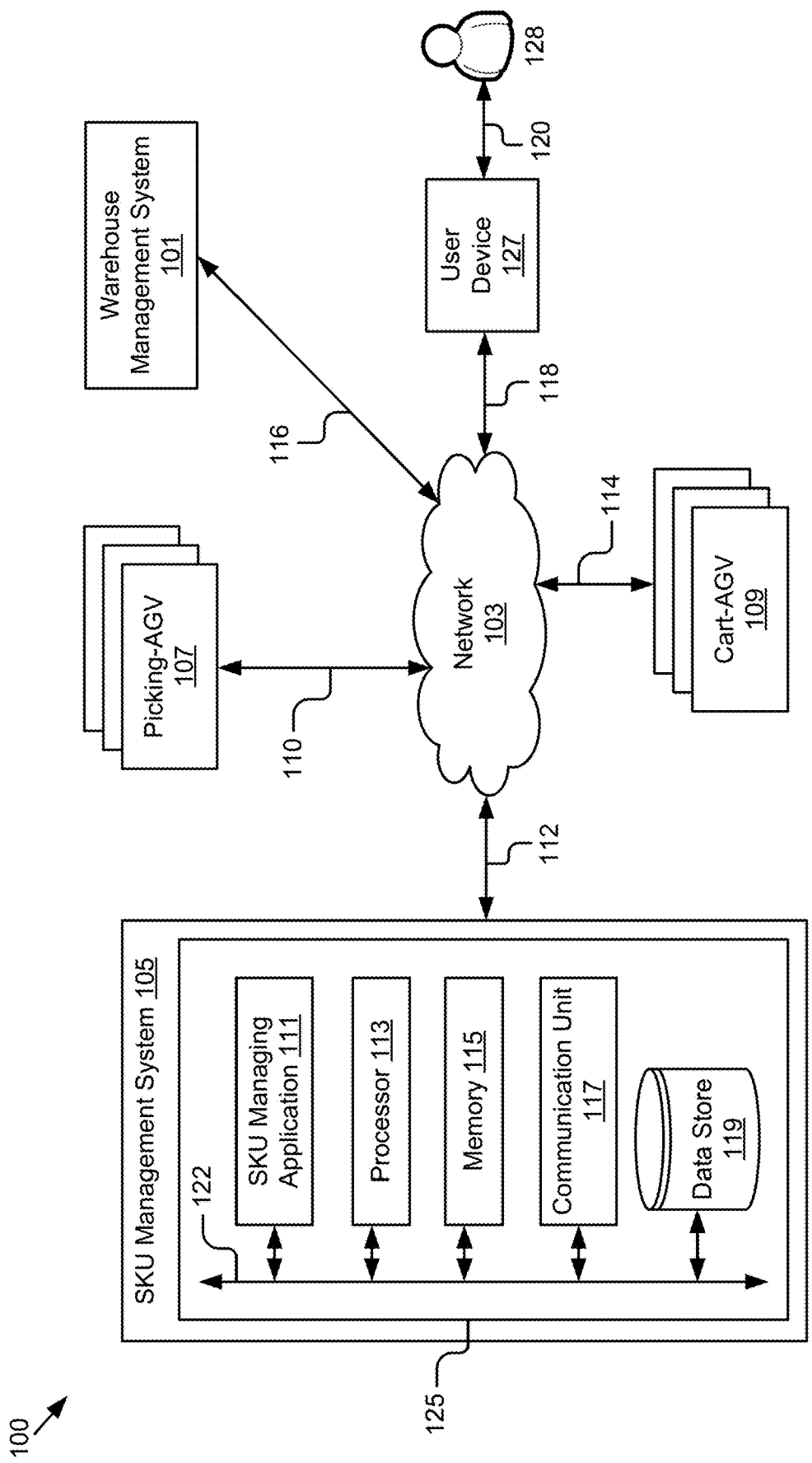
FIG. 1 is a block diagram of an example system for controlling AGVs and organizing inventory items using SKU clusters.

The technology presented in this disclosure addresses the problems discussed in the Background. For example, the technology described herein may be capable of clustering the stock keeping units (SKU) at multiple clustering levels to generate pick-cell clusters, aisle clusters, rack clusters, and mini-pallet clusters based on the SKU affinities between the SKUs. The SKUs may represent physical products. As a result, the items represented by SKUs can be optimally organized into mini-pallets (e.g., cartons, boxes, pallets, or other containers capable of holding one or more physical items), rack units, storage aisles, etc., based on the likelihood of these SKUs appearing in the same customer orders, thereby reducing the number of tasks needed to retrieve various requested SKUs. In addition, the present technology may assign customer orders to pick-cell stations for order fulfillment based on the pick-cell clusters. Implementations of the technology described herein reduce the time, energy, and computational resources consumed by retrieving various items from storage. It should be noted that although SKUs are described herein, the technology may use any code, title, representation, or other value that describes items. For instance, the technology may additionally or alternatively use item identifiers, such as, universal product codes (UPC), serial numbers, model IDs, or any other code representing items. Further, the description herein may describe, for example, retrieving a SKU from a storage rack using an automated guided vehicle, however, it should be understood that a physical item corresponding to the SKU is retrieved, but the description may refer to retrieving a SKU to simplify the description.

In some embodiments, the present technology may cluster the SKUs with sufficient (e.g., whether a value is sufficient may be based on a defined threshold, as described herein) order volume and/or SKU affinities, and subsequently assign remaining SKUs without sufficient volume and/or SKU affinities to the generated clusters. This may provide improved accuracy of the SKU clustering by excluding those SKU about which there is insufficient data caused by the presence of the SKUs with insufficient demand and/or insufficient SKU affinities in the clustering model described herein. In some embodiments, for a first SKU included in a first cluster and a second SKU included in a second cluster, the technology may determine whether to replicate the first SKU of the first cluster to the second cluster based on a SKU replica threshold of the first SKU and the pair replica target of the first SKU pair, in which the first SKU pair includes the first SKU and the second SKU, as described in further detail below. It should be noted that a pair, as described herein, may include 2, 3, 4 or any other quantity of items, depending on the embodiment, without departing from the scope of this disclosure. Thus, the present technology may increase the number of clusters containing the first SKU pair while controlling the number of clusters in which the first SKU appears in given its order volume. As the first SKU pair may be present in multiple clusters, the first SKU pair may therefore be assigned to multiple pick-cell stations or stored at multiple physical locations within the storage area, thereby facilitating the retrieval of the first SKU and the second SKU together while maintaining a reasonable replenishment cost of the first SKU in a fulfillment facility. The present technology may be advantageously applicable to automated storage facilities in which the tasks of retrieving, transporting, replenishing, etc., inventory items are partially or fully performed by Automated Guided Vehicles (AGV), warehouse robotic machines, etc., thereby increasing the efficiency of the AGVs.

FIG. 1 is a block diagram of an example system 100 for controlling AGVs and organizing inventory items using SKU clusters. As shown, the system 100 includes a warehouse management system 101, a SKU management system 105, one or more picking-AGVs 107, one or more cart-AGVs 109, and a user device 127 coupled for electronic communication via a network 103. It should be understood that the system 100 depicted in FIG. 1 is provided by way of example and the system 100 and/or further systems contemplated by the present disclosure may include additional and/or fewer components, may combine components and/or divide one or more of the components into additional components, etc. For example, the system 100 may include any number of warehouse management systems 101, SKU management systems 105, picking-AGVs 107, cart-AGVs 109, or user devices 127.

The network 103 may be a conventional type, wired and/or wireless, and may have numerous different configurations including a star configuration, token ring configuration, or other configurations. Furthermore, the network 103 may include one or more local area networks (LAN), wide area networks (WAN) (e.g., the Internet), personal area networks (PAN), cellular networks, public networks, private networks, virtual networks, virtual private networks, peer-to-peer networks, near field networks (e.g., Bluetooth, NFC, etc.), and/or other interconnected data paths across which multiple devices may communicate.

The network 103 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other suitable protocols. In some embodiments, the network 103 is a wireless network using a connection, such as DSRC (Dedicated Short Range Communication), WAVE, 802.11p, a 3G, 4G, 5G+ network, WiFi™, satellite networks, or other suitable networks. Although FIG. 1 illustrates a single block for the network 103 that couples to the warehouse management system 101, the SKU management system 105, the picking-AGVs 107, the cart-AGVs 109, and the user device 127, it should be understood that the network 103 may in practice comprise any number of combination of networks, as noted above.

The warehouse management system (WMS) 101 can manage a variety of tasks to support and/or control operations of a storage facility. In some embodiments, the WMS 101 may include a hardware and/or virtual server that includes processor(s), memory(ies), and network communication capabilities (e.g., communication unit(s)). The WMS 101 may be communicatively coupled to the network 103. In some embodiments, the WMS 101 may send and receive data to and from other components of the system 100. For example, the WMS 101 may keep track of the inventory level of a stock keeping unit (SKU), and send a purchase order to a vendor server when the inventory level of the SKU is low. In another example, the WMS 101 may receive customer orders, process the customer orders, and send the customer orders to the SKU management system 105 for order fulfillment. In some embodiments, the WMS 101 may keep track of new SKUs and retired SKUs of the storage facility, and send the information of these SKUs to the SKU management system 105 to adjust the arrangement of the SKUs in storage area accordingly.

The Automated Guided Vehicle(s) (AGVs) are robotic vehicles operating in the storage facility. In some embodiments, the AGV(s) may include drive unit(s) adapted to provide motive force for moving the AGVs and attached component(s) (e.g., AGV carts, AGV racks, AGV shelves, etc.), guidance system(s) for determining position of the AGVs within the storage facility, equipment(s) for carrying items, etc. Non-limiting examples of the equipment for carrying items include, but are not limited to, carton holders, mini-pallet holders, AGV shelves, etc. In some embodiments, the AGVs may include the picking-AGVs 107, the cart-AGVs 109, etc. Other types of AGV are also possible and contemplated.

The picking-AGV 107 may include an automated guided vehicle or robot configured to autonomously transport one or more container units. For example, the picking-AGV 107 may autonomously transport one or more mini-pallets (with or without inventory items stored therein) between a storage area, a pick-to-carton area, and/or a replenishment area, etc., of a storage facility. In some embodiments, the picking-AGV 107 may include mini-pallet holder (e.g., AGV carts, AGV shelves, etc.) adapted to hold one or more mini-pallets. In some embodiments, the mini-pallet may be a container unit including one or more compartments (e.g., storage bins) to separately store inventory item(s) belonging to one or more SKUs in each compartment. In some embodiments, the mini-pallet may be divided into multiple compartments by one or more movable division elements, and thus the compartments of the mini-pallets can be dynamically resized.

In some embodiments, the picking-AGV 107 may include a container handling mechanism adapted to autonomously retrieve the mini-pallets from the shelves of the rack units, place the mini-pallets on the mini-pallet holders (e.g., the AGV shelf) of the picking-AGV 107, place the mini-pallets at the pick-cell stations, return the mini-pallets to the shelves of the rack units, etc. As an example, the picking-AGV 107 may retrieve a mini-pallet from a shelf of a rack unit in a storage aisle, place the mini-pallet on its mini-pallet holder, and transport the mini-pallet to a pick-cell station. In this example, after the human worker 128 in the pick-cell station picks inventory items from the mini-pallet and places the inventory items into cartons to fulfill the customer orders, the picking-AGV 107 may return the mini-pallet to the shelf of the rack unit in the storage aisle.

The cart-AGV 109 may include an automated guided vehicle or robot configured to autonomously transport cartons to and from pick-cell stations of the storage facility. In some embodiments, the cart-AGV 109 may include a carton holder (e.g., AGV carts, AGV shelves, etc.) adapted to hold cartons. In some embodiments, the cartons may include a box (e.g., a shipping box) adapted to hold inventory items. For example, a cart-AGV 109 may push/pull a cart (e.g., the carton holder) holding one or more cartons around the pick-to-carton area, and may automatically stop at pick-cell stations in the pick-to-carton area so that the human workers 128 in the pick-cell stations can place inventory items into the cartons to fulfill the customer orders. In some embodiments, once the cartons are completed with the corresponding ordered items, the cart-AGV 109 may transport the cart with the cartons to a shipping dock of the storage facility to send the cartons to the customers.

The user device 127 is a computing device that includes memory(ies), processor(s), input/output device(s), and communication unit(s). The user device 127 may be coupled to the network 103, to send and receive data to and from the warehouse management system 101, the SKU management system 105, the picking-AGV(s) 107, the cart-AGV(s) 109, and/or any other components of the system 100. Non-limiting examples of the user device 127 include, but are not limited to, desktop computers, laptop computers, tablet computers, holographic computers, mobile phones, personal digital assistants (PDA), or any other electronic devices capable of displaying data and/or receiving input data and providing the input data to other components of the system 100. In some embodiments, the user device 127 may display information of the customer order to the human worker 128. For example, for each customer order, the user device 127 may display the ordered SKU(s), the order quantity of each ordered SKU, the fulfillment status (order received, fulfillment in progress, order completed, etc.), etc., of the customer order on its input/output device, and thus the human worker 128 in the pick-cell station may place one or more ordered items into the carton accordingly. In some embodiments, the human worker 128 may interact with the user device 127 to enter the input data. For example, the human worker 128 may enter the input data indicating that a particular SKU (e.g., corresponding to Brand A Highlighter) needs to be replenished. Other types of input data are also possible and contemplated.

The SKU management system 105 can manage the assignment and/or the placement of multiple SKUs in various physical locations (e.g., pick-cell stations, storage aisles, rack units, mini-pallets, etc.) of the storage facility. In some embodiments, the SKU management system 105 may include computing device(s) 125, the computing device(s) 125 may include a SKU managing application 111, processor(s) 113, memory(ies) 115, communication unit(s) 117, and data store(s) 119. In some embodiments, the SKU management system 105 may be coupled to the network 103, and may send and receive data to and from the WMS 101, the picking-AGV(s) 107, the cart-AGV(s) 109, the user device(s) 127, and/or any other components of the system 100 via the network 103. For example, the SKU management system 105 may transmit signals to one or more picking AGVs 107 to direct the picking AGVs 107 to retrieve, replace, or rearrange items (e.g., in mini-pallets, depending on the configurations), as described below.

The processor 113 may execute software instructions by performing various input, logical, and/or mathematical operations. The processor 113 may have various computing architectures to method data signals including, for example, a complex instruction set computer (CISC) architecture, a reduced instruction set computer (RISC) architecture, and/or an architecture implementing a combination of instruction sets. The processor 113, which may include one or more processors, may be physical and/or virtual, and may include a single core or plurality of processing units and/or cores. In some embodiments, the processor 113 may be capable of generating and providing electronic signals to the picking-AGVs 107, the cart-AGVs 109, and the user device 127, performing complex tasks, such as SKU clustering, storage location management, etc. In some embodiments, the processor 113 may be coupled to the memory 115 via the bus 122 to access data and instructions therefrom and store data therein. The bus 122 may couple the processor 113 to the other components of the computing device 125 including, for example, the SKU managing application 111, the memory 115, the communication unit 117, and/or the data store 119.

The memory 115 may store and provide access to data to the other components of the computing device 125. The memory 115 may be included in a single computing device or a plurality of computing devices. In some embodiments, the memory 115 may store instructions and/or data that may be executed by the processor 113. For example, the memory 115 may store the SKU managing application 111 and/or its respective components, depending on the configuration. The memory 115 is also capable of storing other instructions and data, including, for example, an operating system, hardware drivers, other software applications, databases, etc. The memory 115 may be coupled to the bus 122 for communication with the processor 113 and the other components of computing device 125.

The memory 115 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 113. In some embodiments, the memory 115 may include one or more of volatile memory and non-volatile memory (e.g., RAM, ROM, hard disk, optical disk, etc.). It should be understood that the memory 115 may be a single device or may include multiple types of devices and configurations.

The bus 122 may include a communication bus for transferring data among components of a computing device or between computing devices, a network bus system including a network or portions thereof, a processor mesh, a combination thereof, etc. In some embodiments, various other components operating on the computing device 125 (operating systems, device drivers, etc.) may cooperate and communicate via a communication mechanism included in or implemented in association with the bus 122. The software communication mechanism may include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. In some embodiments, any or all of the communication can be secure (e.g., SSH, HTTPS, etc.).

The communication unit 117 may include one or more interface devices (I/F) for wired and wireless connectivity among the components the system 100. For example, the communication unit 117 may include, but is not limited to, various types known connectivity and interface options. The communication unit 117 may be coupled to the other components of the computing device 125 via the bus 122. The communication unit 117 may be coupled to the network 103, depending on the configuration. In some embodiments, the communication unit 117 may link the processor 113 to a network (e.g., the Internet, an intranet, etc.), which may in turn be coupled to other processing systems. The communication unit 117 may provide other connections to a network and to servers or computing devices using various standard communication protocols.

The data store 119 includes a non-transitory storage medium that stores various types of data and provides access to the data. The data stored by the data store 119 may be organized and queried using various criteria. For example, the data store 119 may include data tables, databases, or other organized collections of data. In some embodiments, the data store 119 may be included in the computing device 125 or in another computing system and/or storage system distinct from but coupled to or accessible by the computing device 125. In some embodiments, the data store 119 may be incorporated with the memory 115 or may be distinct therefrom. In some embodiments, the data store 119 may store data associated with a database management system (DBMS) operable on the computing device 125. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 119 may include, but is not limited to, order data, SKU velocity data, cluster algorithm data, cluster data, storage location data, picking task data, etc. In some embodiments, the order data may describe one or more customer orders to be fulfilled and delivered to the customers. In some embodiments, for each customer order, the order data may include the order identifier (ID) uniquely identifying the customer order, the SKU(s) uniquely identifying the inventory item(s) being ordered (e.g., the SKU of "N050395" and the SKU of "S331187"), the product name of each ordered SKU (e.g., corresponding to copy paper ABC or pen DEF), the quantity of each ordered SKU (e.g., 3 cases of copy paper and 5 boxes of pens), the order timestamp indicating the date and time at which the customer order is received (e.g., Jun. 17, 2018-14:00:00), the target fulfillment timestamp indicating the date and time at which the customer order is scheduled to be completed (e.g., Jun. 18, 2018-14:00:00), etc. Other types of order data are also possible and contemplated.

In some embodiments, the data store 119 may store the SKU velocity data, the SKU velocity data may represent a SKU velocity of SKUs in the storage facility over time. For example, the SKU velocity of a SKU may indicate the order volume of the SKU. In some embodiments, the order volume of the SKU may indicate the number of orders that contain the SKU in a defined time period (e.g., 480 orders/70 days), and may thus reflect the customer demand of the SKU.

In some embodiments, the data store 119 may store cluster algorithm data, which may include, for instance, various clustering parameters for clustering the SKUs. In some embodiments, the SKUs may be clustered at various clustering levels (e.g., a clustering level of a pick-cell to generate pick-cell clusters, a clustering level of a storage aisle to generate aisle clusters, a clustering level of a rack unit to generate rack clusters, a clustering level of a mini-pallet to generate mini-pallet clusters, etc.). In some embodiments, for a particular clustering level, the cluster algorithm data may specify a to-be-clustered SKU order volume threshold, which may indicate a threshold number of orders that contain a SKU in a defined time period so that the SKU is qualified to be clustered (e.g., fewer than 75 orders/70 days, etc.). In some embodiments, the cluster algorithm data may specify a to-be-replicated SKU order volume threshold, which may indicate a threshold number (e.g., more than 150 orders/70 days, etc.) of orders within a given time period that contain a SKU and may indicate, as described herein, that the SKU may be replicated among multiple clusters. In some embodiments, the cluster algorithm data may specify a SKU pair order volume threshold, which may indicate a threshold number of orders (e.g., greater than 3 orders/70 days, etc.) that contain a SKU pair in a defined time period and may indicate that the SKUs of the SKU pair may be replicated among multiple clusters.

In some embodiments, the cluster algorithm data may specify a threshold cluster size, the threshold cluster size may indicate a threshold number of SKUs included in a cluster (e.g., fewer 100 SKUs, etc.). In some embodiments, the cluster algorithm data may specify a threshold SKU affinity (e.g., less than 0.1), which may be used to determine the isolated SKUs. In some embodiments, the cluster algorithm data may also specify a cluster division factor, which may indicate a number of clusters (e.g., 2, 3, 4, 10, etc., clusters) to be generated from SKUs in a clustering cycle. For example, a clustering cycle may be a round of clustering during which a cluster is divided into sub clusters, which number of sub-clusters may be defined by a cluster division factor.

In some embodiments, cluster algorithm data may specify a SKU replica threshold based on the order volume of a SKU. For example, the SKU replica threshold may indicate a threshold number of clusters that include a SKU given the order volume of the SKU. In some embodiments, each cluster at a particular clustering level may be assigned to a physical location of the corresponding location type (e.g., pick-cell station, storage aisle, rack unit, etc.), and the SKU replica threshold may indicate the threshold number of physical locations at which a SKU is available. For example, at an aisle clustering level, for the SKUs having the order volume within the range of [0, 150 orders/70 days], the cluster algorithm data may specify the SKU replica threshold of these SKUs to be 1 aisle cluster, and thus these SKUs may be stored at most in 1 storage aisle. For a SKU having an order volume within the range of [151 orders/70 days, 225 orders/70 days], the cluster algorithm data may specify the SKU replica threshold of these SKUs to be 2 aisle clusters, and thus these SKUs (e.g., items represented by each of these SKUs) may be stored at most in 2 storage aisles. For a SKU having the order volume higher than 600 orders/70 days, the cluster algorithm data may specify the SKU replica threshold to be 5 aisle clusters, and thus the item represented by the SKU may be stored at most in 5 storage aisles. It should be noted that these example order volumes, thresholds, time periods, etc., are provided by way of example and other values are possible and contemplated herein.

In some embodiments, the cluster algorithm data may specify a pair replica target based on an order volume of SKU pairs. For instance, the pair replica target may indicate a target number of clusters that include both of the SKUs in a given SKU pair based on the order volume of the given SKU pair. A cluster may be assigned to a physical location (e.g., in a location type, such as a pick-cell station, storage aisle, rack unit, etc., corresponding to a clustering level), so the pair replica target may indicate the target number of physical locations at which a SKU pair is available. For example, at an aisle clustering level, for SKU pairs having an order volume within a given range (e.g., [0, 10 orders/70 days]), the cluster algorithm data may specify the pair replica target of these SKU pairs to be 0, and thus the two SKUs in each of these SKU pairs may not be stored together in any storage aisle. For SKU pairs having the order volume in a second given range (e.g., [26 orders/70 days, 35 orders/70 days]), for example, the cluster algorithm data may specify the pair replica target of these SKU pairs to be 2 aisle clusters, and thus the two SKUs in each of these SKU pairs may be stored together in at least 2 storage aisles. For SKU pairs having an order volume higher than a third given range (e.g., greater than 100 orders/70 days), the cluster algorithm data may specify the SKU replica threshold of these SKUs to be 4 aisle clusters, and thus the two SKUs in each of these SKU pairs may be stored together in 4 storage aisles. It should be noted that other types of clustering parameters are also possible and contemplated.

Figure 12:
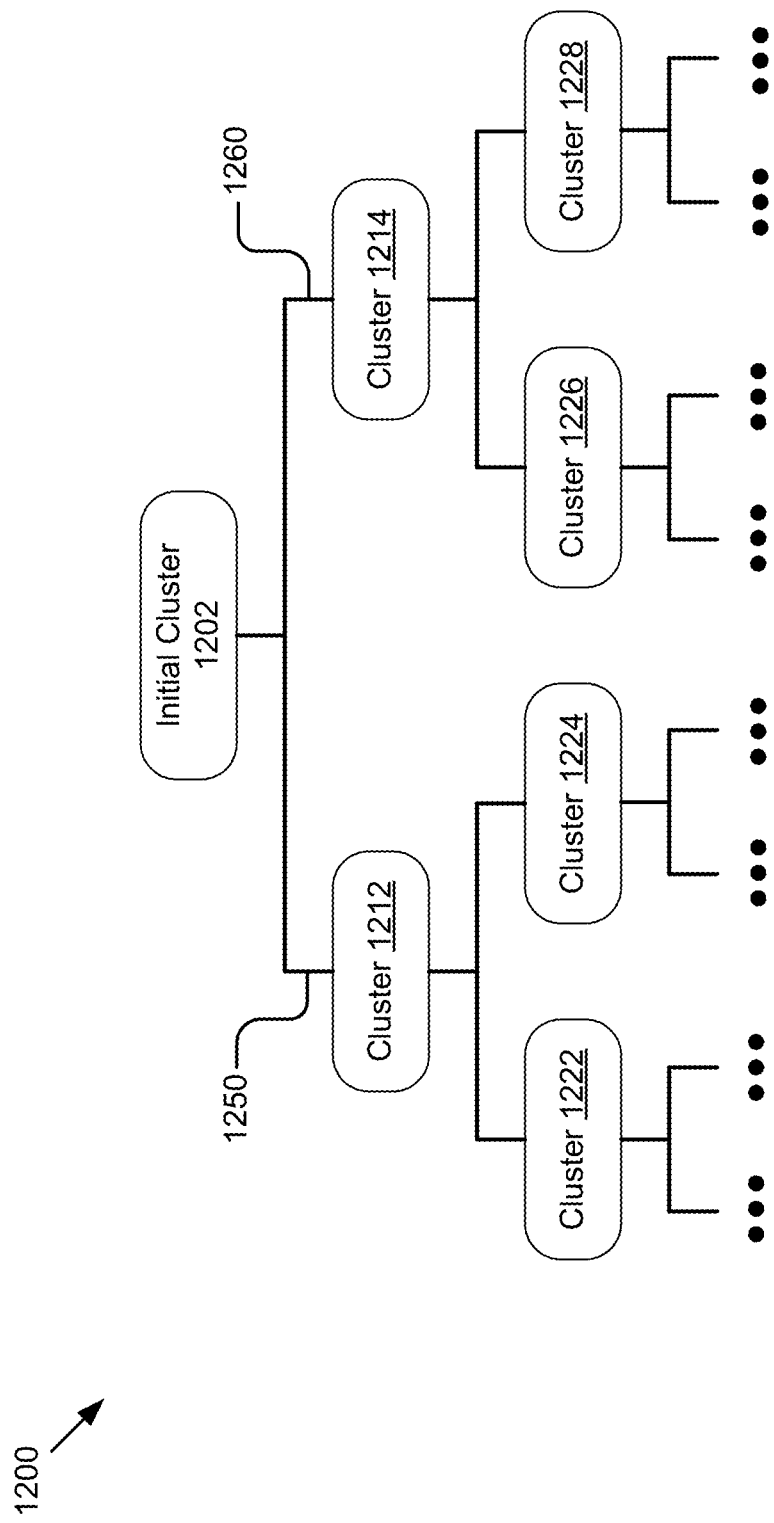
FIG. 12 illustrates an example cluster model.

In some embodiments, for one or more clustering levels, the data store 119 may store a cluster model describing a hierarchical structure of multiple clusters, and, in some instances, the multiple clusters may be generated as the SKU clustering is performed at the clustering level (e.g., clustering level of pick-cell, clustering level of storage aisle, etc.). FIG. 12 illustrates an example cluster model 1200. As depicted, the cluster model 1200 may include an initial cluster 1202 as a root node, which may include a set of to-be-clustered SKUs. In the first clustering cycle, the initial cluster 1202 may be divided into a cluster 1212 and a cluster 1214. The cluster 1212 and the cluster 1214 may be branch nodes at a first clustering depth. As depicted, the cluster 1212 may be associated with a branch 1250 and the cluster 1214 may be associated with a branch 1260 of the cluster model 1200. In some embodiments, in a second clustering cycle, the cluster 1212 may be divided into a cluster 1222 and a cluster 1224. In some embodiments, in a third clustering cycle, the cluster 1214 may be divided into a cluster 1226 and a cluster 1228. For instance, the cluster 1222, the cluster 1224, the cluster 1226, and the cluster 1228 may be the leaf nodes (or branch nodes, etc., depending on the embodiment) at a second clustering depth. In some embodiments, as SKU clustering continues, these clusters may be further divided into sub-clusters at higher clustering depth(s) until the generated clusters satisfy one or more defined constraints (e.g., defined threshold cluster size) and therefore are determined to be result clusters. For example, a result cluster may indicate, for instance, a cluster that satisfies defined constraint(s), such as a constraint on size, quantity of SKUs, SKU affinity, order frequency, or other constraints, for example, a result cluster at a rack unit cluster level may be output to indicate (e.g., to a computing device, AGV, etc.) that the items corresponding to the SKUs in the result cluster are to be stored in a particular rack unit. In some embodiments, the clustering depth of the cluster may specify the distance of the cluster to the root node, thereby indicating the relative position of the cluster in the cluster model.

In some embodiments, the data store 119 may store the cluster data describing one or more clusters. In some embodiments, the cluster data may include a cluster ID identifying each cluster, a clustering level of the cluster (e.g., clustering level of pick-cell, clustering level of storage aisle, clustering level of rack unit, etc.), a cluster status of the cluster (e.g., e.g., whether it is a temporary cluster, result cluster, or output cluster, as described herein), one or more SKUs included in the cluster, etc. In some embodiments, a temporary cluster may be generated in a clustering cycle but may not satisfy one or more defined constraints, and thus additional clustering cycle(s) may be performed on the cluster. In some embodiments, the result cluster may be generated in a clustering cycle and satisfies one or more defined constraints. In some embodiments, output clusters may be obtained by assigning the disregarded SKUs (e.g., non-clustering SKUs) to the result clusters, and the output clusters may then be assigned to physical locations in the storage area (e.g., pick-cell stations, storage aisle, rack unit, mini-pallets, etc.), although output clusters may be assigned to physical locations without adding additional SKUs, depending on the embodiment.

In some embodiments, cluster data may indicate the clustering depth of the cluster (e.g., a temporary cluster or cluster with a non-result cluster status) in the corresponding cluster model. If the cluster is a result cluster, the cluster data may indicate one or more cluster quality metrics indicating the quality of the cluster. In some embodiments, cluster quality metrics may include a cluster connectedness metric indicating an average correlation of the demand between 2 SKUs of the cluster, a cluster similarity metric indicating the level of similarity (e.g., based on correlation of attributes, SKU affinity, order volume, etc.) between the cluster and other result clusters, a pair satisfiability metric indicating an average number of clusters that include a SKU pair (e.g., due to replication, for instance, as described elsewhere herein), in which the SKU pair includes 2 SKUs of the cluster and the SKU pair was present in customer order(s) in the order history, etc. Other types of cluster data are also possible and contemplated.

In some embodiments, the data store 119 may store a cluster queue, which includes one or more temporary clusters (e.g., clusters that may still be processed or that don't satisfy defined constraints) for which additional clustering or processing may be performed to generate result clusters. In some embodiments, the cluster queue may operate in First In First Out (FIFO) order with the cluster at the start position of the cluster queue is selected to be processed. In some instances, if one or more temporary clusters are generated as a result of the SKU clustering, these temporary clusters may be appended to the end of the cluster queue. Thus, the temporary clusters in the cluster queue may be positioned in the increasing order of clustering depth.

Continuing the above example, the cluster 1212 and the cluster 1214 in the cluster model 1200 may be respectively added to a first position and a second position of the cluster queue. For instance, the clusters 1212 and the cluster 1214 may be leaf and/or branch nodes at a first clustering depth. Because the cluster 1212 may occupy a start position in the cluster queue, the cluster 1212 may be selected to be processed and may be divided into the cluster 1222 and the cluster 1224. The cluster 1222 and the cluster 1224 may be leaf and/or branch nodes at the second clustering depth and may be added to the end of the cluster queue. As a result, the cluster 1214 at the first clustering depth may be selected from the cluster queue for processing prior to the cluster 1222 and the cluster 1224 at the second clustering depth. This implementation of breadth-first traversal may be advantageous, for example, because the limited number of clusters that can contain a particular SKU or a particular SKU pair, as specified by the SKU replica threshold and the pair replica target, can be properly allocated between the cluster 1212 and the cluster 1214 having the same clustering depth. Otherwise, if the cluster 1214 is processed after the clusters in the branch 1250 associated with the cluster 1212 are processed, these replication budgets may be quickly exhausted through multiple clusters of various clustering depths in the branch 1250.

In some embodiments, the data store 119 may store a SKU storing model describing a layout of physical locations within the storage facility. For example, the SKU storing model may indicate the positions of pick-cell stations, storage aisles, rack units within each storage aisle, mini-pallets within each rack unit, etc., in the storage facility. In some embodiments, the SKU storing model may map output clusters (e.g., clusters that are output using result clusters, for example, as described above) generated at various clustering levels to corresponding physical locations. For example, the SKU storing model may map a pick-cell cluster to a pick-cell station, an aisle cluster to a storage aisle, a rack cluster to a rack unit, and a mini-pallet cluster to a mini-pallet, etc. In some embodiments, the SKU storing model may be used to store and organize the inventory items of various SKUs in the storage facility.

In some embodiments, the data store 119 may store picking task data describing one or more picking tasks, which may be performed by the picking AGV(s) 107, for example. In some embodiments, for a picking task, the picking task data may include a picking task ID identifying the picking task, and a picking-AGV ID of the picking-AGV 107 performing the picking task. In some embodiments, the picking task data may include a SKU picking list including the SKUs to be retrieved (or replaced, moved, etc., depending on the embodiment), a target storage aisle from which SKUs are retrieved, a target pick-cell station to which SKUs are transported, etc. In some embodiments, the picking task data may include a picking task status (e.g., initiated, picking in progress, completed, etc.), an estimated completion timestamp (e.g., Jun. 18, 2018-13:45:00), etc., of the picking task. Other types of picking task data are also possible and contemplated.

In some embodiments, the data store 119 may be part of a data storage system (e.g., a data or database management system) for storing and providing access to data. Other types of data stored in the data store 119 are also possible and contemplated.

The SKU managing application 111 may include computer logic executable to control AGVs and organize inventory items in storage facility using SKU clusters. In some embodiments, the SKU managing application 111 may be implemented using software executable by one or more processors of one or more computer devices, using hardware, such as but not limited to a field-programmable gate array (FPGA), an application-specific integrated circuit (ASIC), etc., and/or a combination of hardware and software, etc. The SKU managing application 111 may receive and process the order data, the cluster data, etc., communicate with other elements of the computing device 125 via the bus 122, and communicate with other components of the system 100 via the network 103.

In some embodiments, the SKU managing application 111 may cluster the SKUs at multiple clustering levels to generate one or more pick-cell clusters, aisle clusters, rack clusters, and/or mini-pallet clusters, for instance, based on the SKU affinities between the SKUs. The SKU managing application 111 may assign the generated clusters to physical locations (e.g., of location types/areas based on a clustering level, such as, pick-cell stations, storage aisles, rack units, etc.) in the storage facility. For example, the SKU managing application 111 may assign customer orders to the pick-cell stations for order fulfillment and generate picking tasks for the picking-AGVs 107 to retrieve and transport ordered items from the storage area to the pick-cell stations, etc., based on these clusters. The SKU managing application 111 is described in further detail below with reference to FIGS. 2-15, for example.

Figure 2:
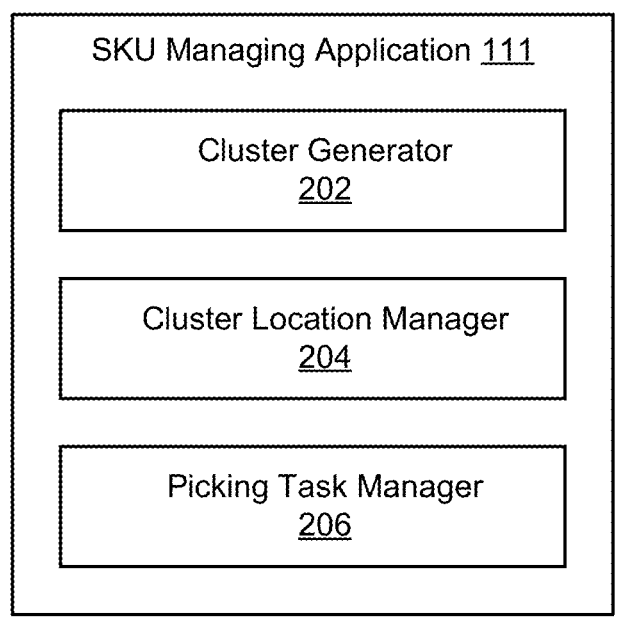
FIG. 2 is a block diagram of an example SKU managing application.

FIG. 2 is a block diagram of an example SKU managing application 111. As depicted, the SKU managing application 111 may include a cluster generator 202, a cluster location manager 204, and a picking task manager 206. It should be understood that the SKU managing application 111 may include additional components such as, but not limited to, a configuration engine, an encryption engine, etc., and/or the various components may be combined into a single engine or divided into additional engines.

The cluster generator 202, the cluster location manager 204, and the picking task manager 206 may be implemented as software, hardware, or a combination of the foregoing. In some embodiments, the cluster generator 202, the cluster location manager 204, and the picking task manager 206 may be communicatively coupled by the bus 122 and/or the processor 113 to one another and/or to the other components of the computing device 125. In some embodiments, one or more of the components 111, 202, 204, and/or 206 are sets of instructions executable by the processor 113 to provide their functionality. In further embodiments, one or more of the components 111, 202, 204, and/or 206 are storable in the memory 115 and are accessible and executable by the processor 113 to provide their functionality. The components 111, 202, 204, and/or 206 may be adapted for cooperation and communication with the processor 113 and other components of the computing device 125. The SKU managing application 111 and its components 202, 204, and 206 are described in further detail below with reference to at least FIGS. 3-15.

Figure 13:
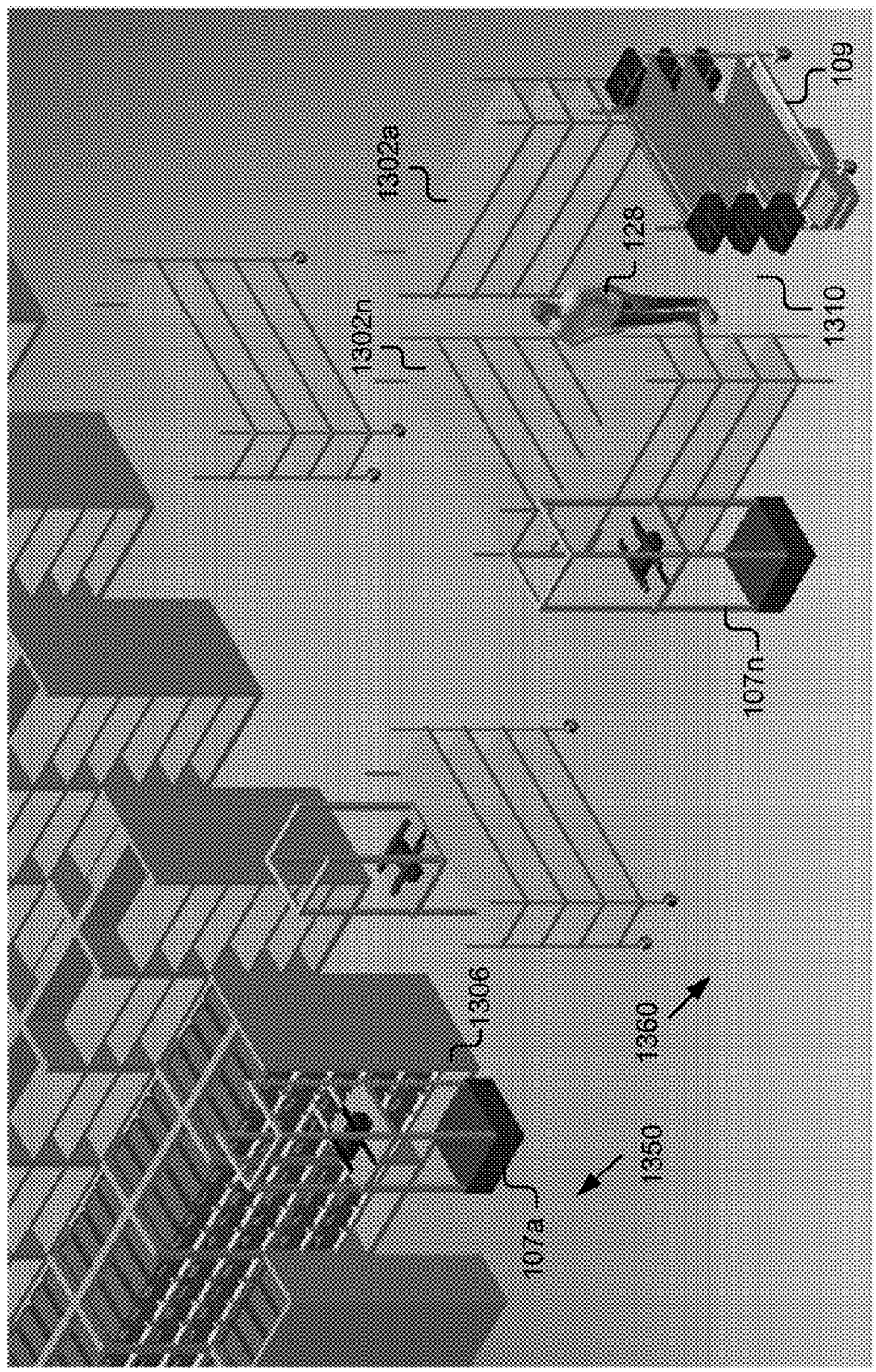
FIG. 13 illustrates an example structure of the storage facility.

As discussed elsewhere herein, the SKU managing application 111 may include computer logic executable to control the AGVs and organize the inventory items in the storage facility. An example illustration 1300 of the storage facility is illustrated in FIG. 13. As depicted in FIG. 13, the storage facility may include a storage area 1350, a pick-to-carton area 1360, and one or more picking-AGVs 107 that retrieve and transport the mini-pallets between the storage area 1350 and the pick-to-carton area 1360. In some embodiments, the mini-pallets may be stored in storage area 1350 and temporarily brought to the pick-to-carton area 1360 to fulfill the customer orders. In some embodiments, the storage area 1350 may store SKUs present in the storage facility in mini-pallets. For instance, the storage area 1350 may include racks 1306, which may be a shelving unit including one or more shelves for holding mini-pallets, and each mini-pallet may store one or more SKUs therein. As discussed elsewhere herein, a mini-pallet may include one or more compartments (e.g., 1-3 storage bins) and may store inventory item(s) corresponding to SKUs separately in each compartment. In this present disclosure, the SKU of the inventory item stored in the mini-pallet may be simply referred to as the SKU stored in the mini-pallet.

In some embodiments, the pick-to-carton area 1360 may include one or more pick-cell stations 1310, which may include one or more pick-cells 1302. In some embodiments, a pick-cell 1302 may be a shelving unit for holding the mini-pallets at the pick-cell station 1310 to perform order fulfillment. The pick-cell station 1310 may also be provided with the user device 127 for displaying the order data of various customer orders to be fulfilled. In some embodiments, in order to fulfill the customer orders, the picking-AGV 107 may retrieve the mini-pallet(s) from the storage area 1350, transport the mini-pallet(s) to the pick-cell station 1310, and place the mini-pallet(s) on the pick-cell(s) 1302 of the pick-cell station 1310. The cart-AGV 109 may transport carton(s) to the pick-cell station 1310, and position itself proximate to the pick-cell station 1310 so that the carton(s)

on the cart-AGV 109 are accessible to the human worker 128. The human worker 128 in the pick-cell station 1310 may pick inventory items from the mini-pallets on the pick-cells 1302 according to the order data displayed on the user device 127, and place these inventory items into the corresponding cartons on the cart-AGV 109 to fulfill the customer orders. Once the cartons are completed with the corresponding ordered items, the cart-AGV 109 may transport the cartons to the shipping dock for delivery.

In some embodiments, the pick-cell station 1310 may have the capacity to hold a defined number of mini-pallets on its pick-cells 1302 (e.g., 36 mini-pallets). In some embodiments, once the picking-AGV 107 transports a mini-pallet to the pick-cell station 1310, the mini-pallet may stay at the pick-cell station 1310 for a defined time period (e.g., 5 minutes) and may then be returned to the storage area 1350. In some embodiments, the mini-pallets may stay at the pick-cell station 1310 until its occupied space on the pick-cell 1302 needs to be reclaimed to place another incoming mini-pallet. In some embodiments, the SKU managing application 111 may determine the mini-pallet to be released based on the number of orders containing its SKU(s). For instance, the SKU managing application 111 may determine the orders that are not yet fulfilled and contain one or more SKUs of the mini-pallet. The SKU managing application 111 may then determine the mini-pallet(s) having the lowest number of these orders to be released from the pick-cell station 1310 and returned to the storage area 1350.

Figure 14:
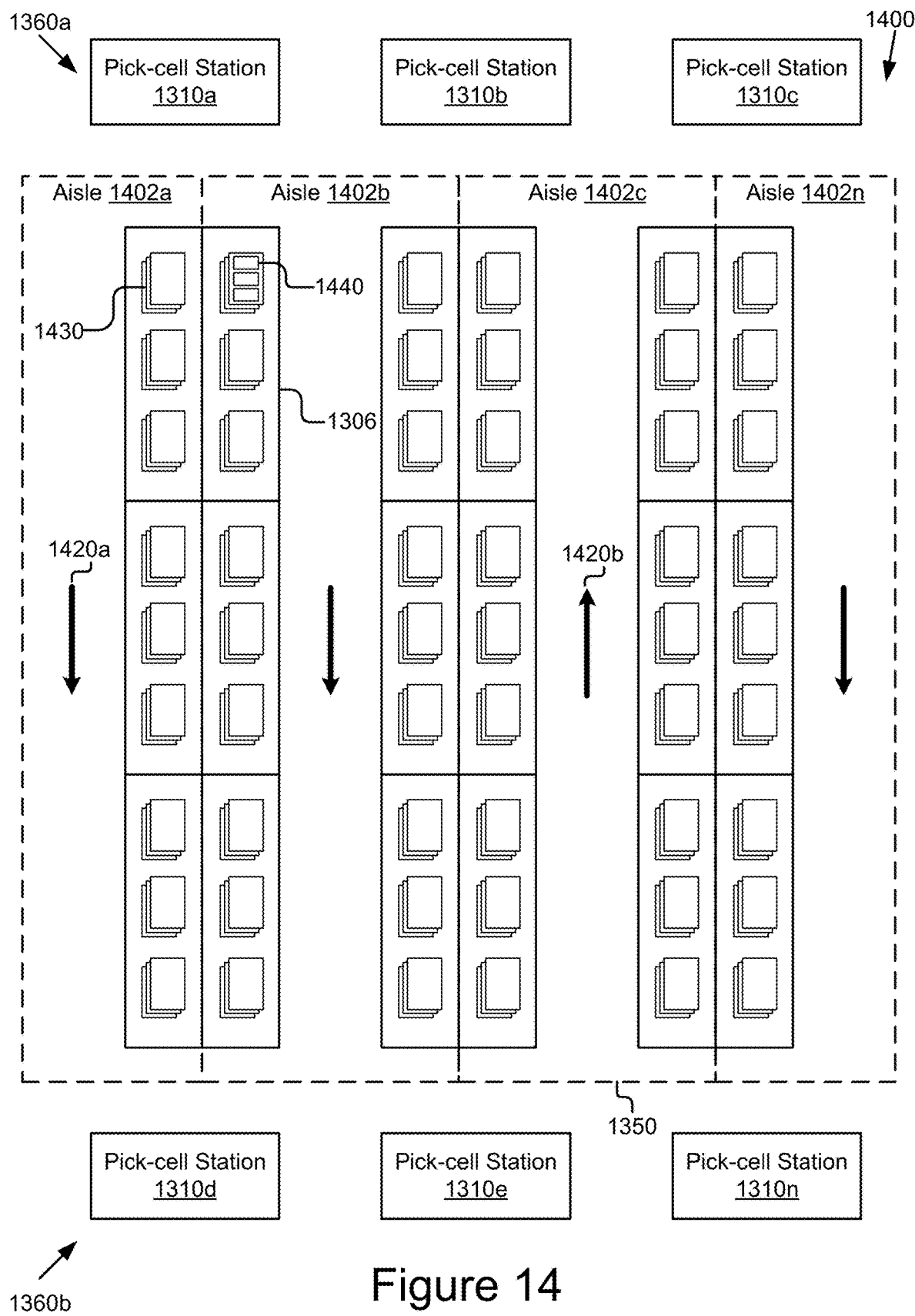
FIG. 14 illustrates an example layout structure of a storage area and pick-to-carton area in the storage facility.
Figure 15:
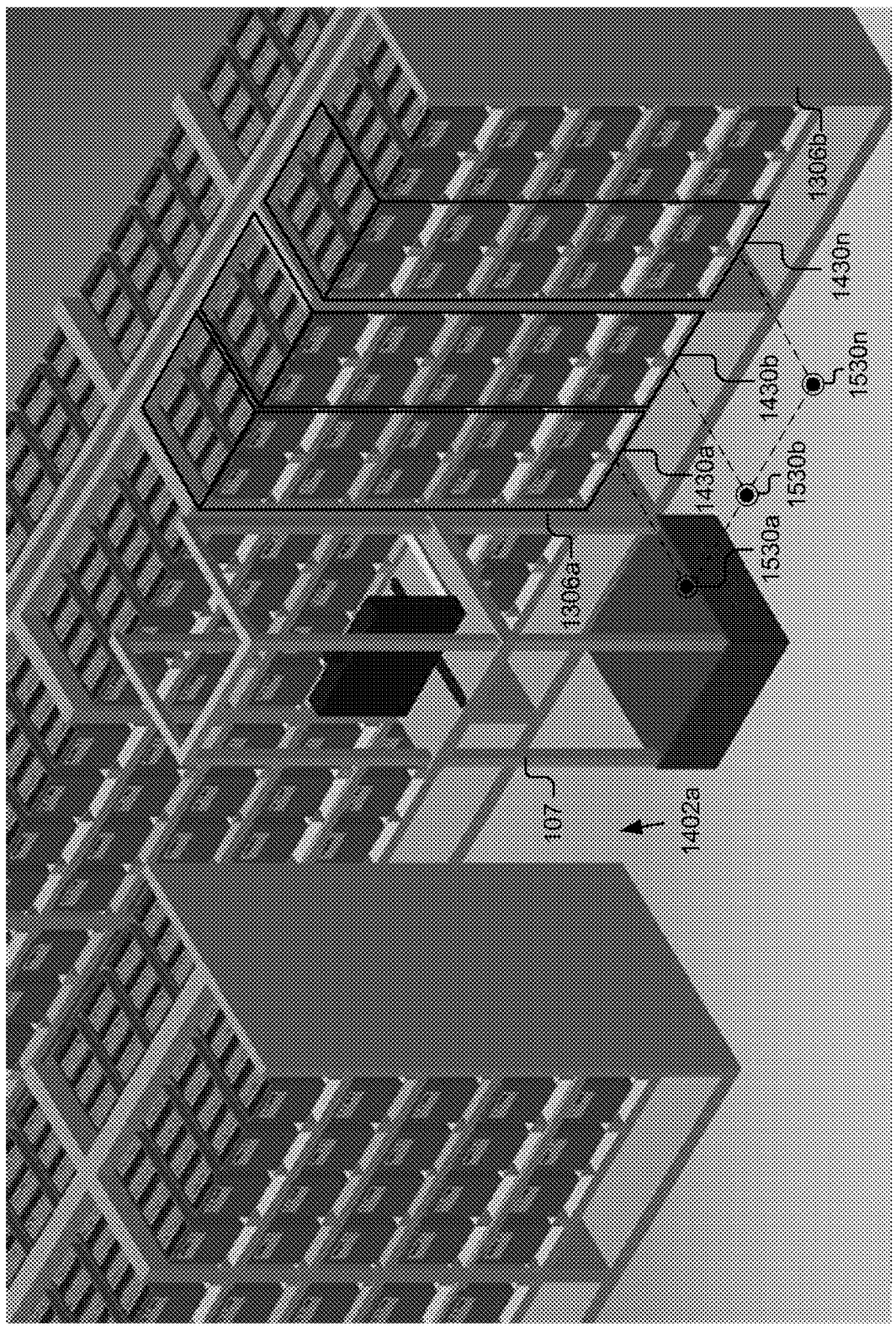
FIG. 15 illustrates an example storage aisle including multiple rack units.

FIG. 14 depicts a diagram 1400 illustrating an example layout of the storage area 1350 and the pick-to-carton area 1360. As depicted, the pick-to-carton area 1360 may include one or more pick-cell stations 1310 at which customer orders may be fulfilled. The storage area 1350 may include racks 1306, which may be organized to form storage aisles 1402. In some embodiments, each storage aisle 1402 may be associated with a traffic direction 1420, and the picking-AGV 107 may travel along the storage aisle 1402 in that traffic direction, although other implementations are possible and contemplated herein. In some embodiments, a storage aisle 1402 may include one or more rack units 1430, which may be accessible from a predefined stop position. As an example, FIG. 15 depicts an illustration 1500 of a storage aisle 1402a including multiple rack units 1430. As depicted, each rack unit 1430 may be associated with a defined stop position 1530 of a picking-AGV 107. For example, a picking-AGV 107 may stop at the predefined stop position 1530a associated with the rack unit 1430a, from which, it may retrieve multiple mini-pallets stored in the rack unit 1430a in a single stop.

Referring back to FIG. 14, in some embodiments, a rack unit 1430 may store one or more mini-pallets 1440 or items, depending on the embodiment. In some embodiments, a mini-pallet 1440 may have one or more compartments to store various SKUs. The mini-pallet 1440 may be a container that is retrievable and transportable by the picking-AGVs 107. Thus, items (e.g., corresponding to SKUs) may be stored, retrieved, transported, replenished, returned, etc., in the mini-pallet 1440.

Figure 3:
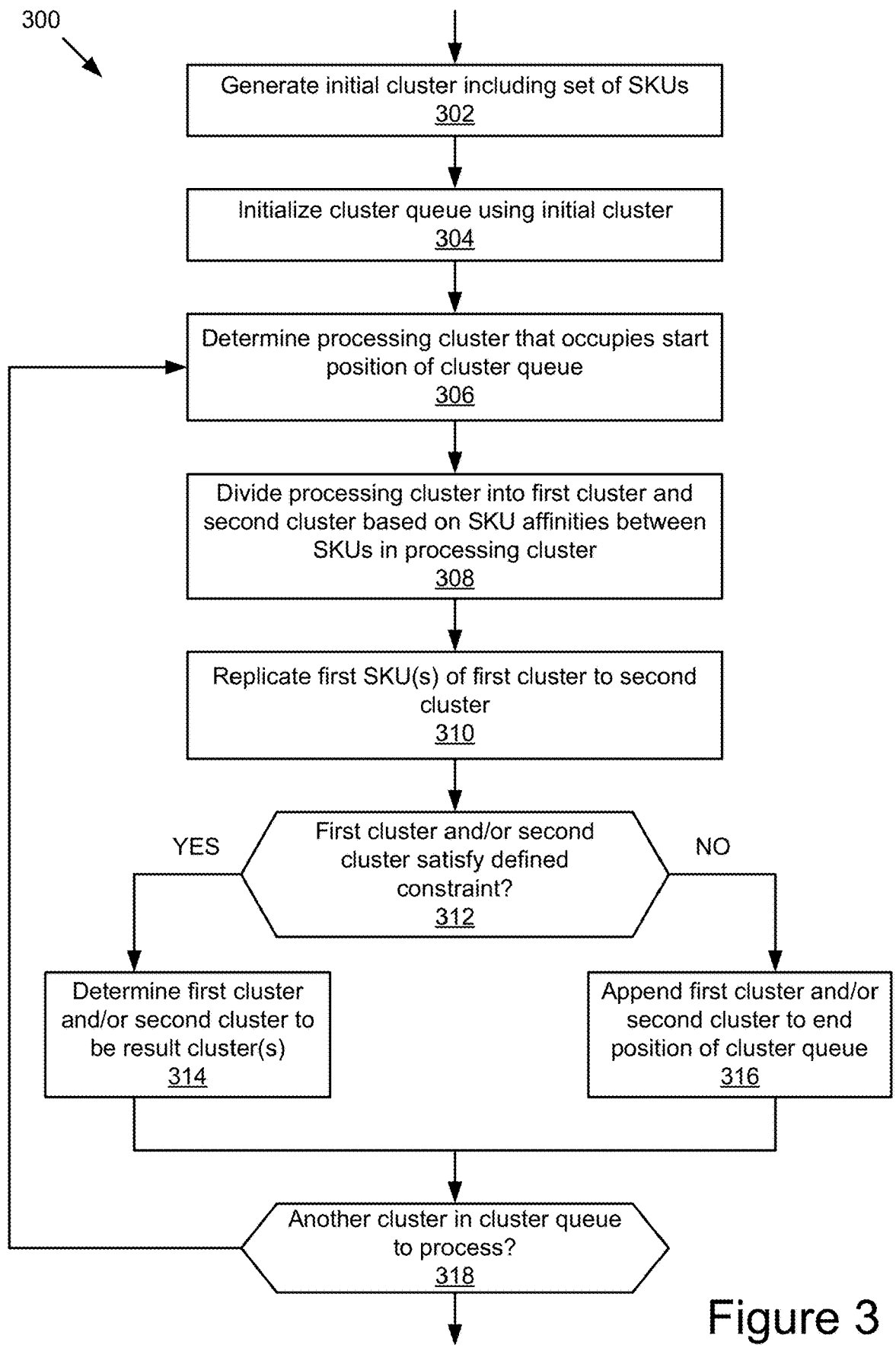
FIG. 3 is a flowchart of an example method for generating clusters to be assigned to pick-cell stations in a storage facility.

FIG. 3 is a flowchart of an example method 300 for generating clusters to be assigned to the pick-cell stations in the storage facility. For example, the method 300 may cluster a set of SKUs into one or more pick-cell clusters, which may then be assigned to a pick-cell station 1310. In block 302, the cluster generator 202 may generate an initial cluster. For example, the cluster generator 202 may determine one or more to-be-clustered SKUs from the SKUs associated with the storage facility based on the order volume of the to-be-clustered SKUs. As discussed elsewhere herein, an order volume of a SKU may indicate the number of orders that contain the SKU over a defined time period (e.g., 480 orders/70 days, 100 orders/10 days, etc.). In some embodiments, the to-be-clustered SKUs may have an order volume satisfying the threshold of to-be-clustered SKU order volume specified, for example, for a pick-cell clustering level (e.g., at least 450 orders/70 days). For example, the to-be-clustered SKU order volume threshold may be dynamically adjusted so that only a defined number of SKUs having the threshold order volume may be selected as the to-be-clustered SKUs from among available (e.g., total, associated with a storage facility, a given set, etc.) SKUs. In some embodiments, the SKUs associated with the storage facility may include all SKUs present in the storage facility. In some embodiments, the cluster generator 202 may generate an initial cluster including some or all of the to-be-clustered SKUs.

In block 304, the cluster generator 202 may initialize the cluster queue using the initial cluster, the cluster queue may include the initial cluster at the start position of the cluster queue. In block 306, the cluster generator 202 may determine a processing cluster. For example, the cluster generator 202 may determine the cluster that occupies the start position of the cluster queue to be the processing cluster. Thus, in the first clustering cycle, the processing cluster may correspond to the initial cluster.

In block 308, the cluster generator 202 may divide the processing cluster into a first cluster and a second cluster based on the SKU affinities between the SKUs in the processing cluster. In some embodiments, the SKU affinity between two SKUs may indicate a correlation between the two SKUs, for example, the cluster generator 202 may determine a SKU affinity between two SKUs to be the frequency of the two SKUs co-present in the same customer order. As an example, the cluster generator 202 may determine that among 100 customer orders, there are 80 customer orders including both a first SKU and a second SKU. Thus, in this example, the cluster generator 202 may determine the SKU affinity between the first SKU and the second SKU to be 0.8 (or some other value, depending on weighting, scaling, or other factors). As another example, the cluster generator 202 may determine that among 100 customer orders including the first SKU, there are 60 customer orders also including the second SKU. Thus, in this example, the cluster generator 202 may determine the SKU affinity between the first SKU and the second SKU to be 0.6. Other implementations for computing the SKU affinities between the SKUs are also possible and contemplated.

Figure 5:
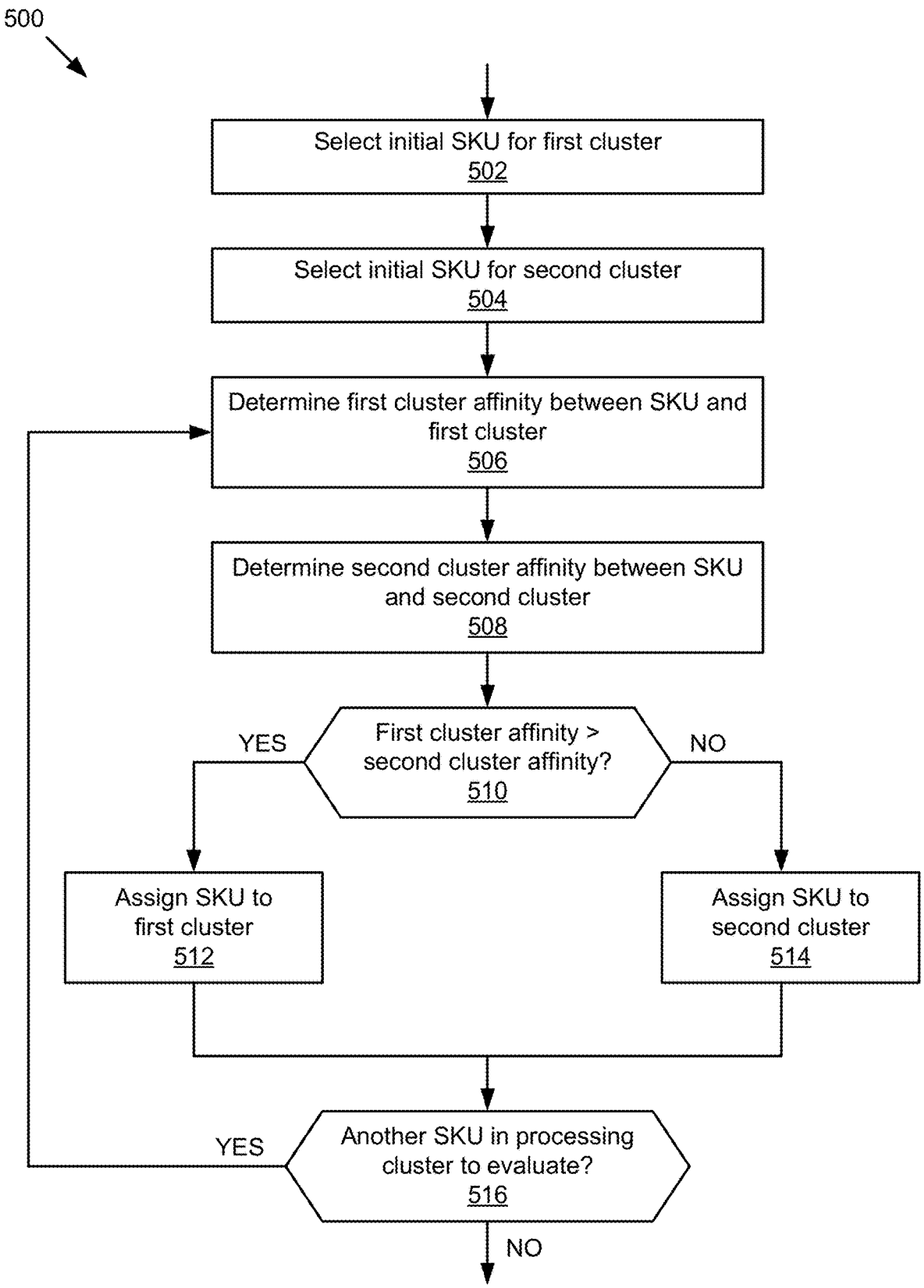
FIG. 5 is a flowchart of an example method for clustering a set of SKUs based on SKU affinities between the SKUs.

A flowchart of an example method 500 for dividing the processing cluster is illustrated in FIG. 5. For example, the method 500 may cluster the SKUs included in the processing cluster into a first cluster and a second cluster based on the SKU affinities among SKUs. In block 502, the cluster generator 202 may select an initial SKU for the first cluster. For example, the cluster generator 202 may randomly select a SKU from the SKUs of the processing cluster to be the initial SKU of the first cluster, or for example, an initial SKU may be selected based on volume, proximity to a pick cell station, or other parameters. In block 504, the cluster generator 202 may select an initial SKU for the second cluster. For example, the cluster generator 202 may randomly select another SKU from the SKUs of the processing cluster to be the initial SKU of the second cluster. It should be noted that although dividing a cluster (e.g., a processing cluster) in two (e.g., into the first and second cluster) is described, the technology described herein may also or alternatively divide into another number of clusters (e.g., 3, 4, 5, etc.).

In some embodiments, for SKUs in the processing cluster, in block 506, the cluster generator 202 may determine a first cluster affinity between a SKU and the first cluster. For instance, a cluster affinity may indicate the demand correlation between a SKU and a cluster. In some embodiments, the cluster generator 202 may determine the SKU affinity between the SKU and each SKU in the first cluster, and determine the first cluster affinity to be the average value of the SKU affinities between the SKU and the SKUs of the first cluster. In block 508, the cluster generator 202 may determine a second cluster affinity between the SKU and the second cluster. Similarly, a second cluster affinity may indicate a demand correlation between the SKU and the second cluster. For example, the cluster generator 202 may determine the SKU affinity between the SKU and each SKU in the second cluster, and determine the second cluster affinity to be the average value of the SKU affinities between the SKU and the SKUs of the second cluster.

In block 510, the cluster generator 202 may determine whether the first cluster affinity between the SKU and the first cluster is higher than the second cluster affinity between the SKU and the second cluster. If in block 510, the cluster generator 202 determines that the first cluster affinity between the SKU and the first cluster is higher than the second cluster affinity between the SKU and the second cluster, the method 500 may proceed to block 512, at which it may assign the SKU to the first cluster. If in block 510, the cluster generator 202 determines that the first cluster affinity between the SKU and the first cluster is not higher than the second cluster affinity between the SKU and the second cluster, the method 500 may proceed to block 514, at which it may assign the SKU to the second cluster.

In block 516, the cluster generator 202 may determine whether the processing cluster includes another SKU to evaluate. If, in block 516, the cluster generator 202 determines that the processing cluster includes another SKU to be evaluated, the method 500 may proceed to block 506 to assign that another SKU either to the first cluster or to the second cluster. If in block 516, the cluster generator 202 determines that the processing cluster does not include another SKU to be evaluated, the method 500 may end. Thus, the method 500 may group together the SKUs of the processing cluster that are frequently co-present in the same customer orders, and thus having SKU affinities with one another higher than their SKU affinities with other SKUs of the processing cluster. It should be understood that various clustering algorithms (e.g., K-means clustering, hierarchical clustering, divisive clustering, etc.) may be used to divide the SKUs of the processing cluster into the first cluster and the second cluster. In some embodiments, the SKUs of the processing cluster may be grouped into more than two clusters, depending on a cluster division factor specified in the cluster algorithm data.

Referring back to FIG. 3, in block 310, the cluster generator 202 may selectively replicate one or more first SKUs in the first cluster to the second cluster. For example, the cluster generator 202 may determine a first SKU in the first cluster to be replicated to the second cluster based on the demand correlation between the first SKU in the first cluster and a second SKU in the second cluster. The cluster generator 202 may then replicate the first SKU to be in both the first cluster and the second cluster. Thus, as the first SKU is replicated to be present in the second cluster that includes the second SKU, and the first SKU and the second SKU may be available at or near the same pick-cell station 1310 to increase the efficiency of fulfilling orders with both the first and second SKU. In addition, because the first SKU is replicated to be present in both first cluster and the second cluster, the first SKU may therefore be available at multiple pick-cell stations 1310, and thus the order fulfillment of various customer orders including the first SKU may be performed in parallel.

A flowchart of an example method 600 for selectively replicating a SKU across multiple clusters is illustrated in FIG. 6. For example, the method 600 may determine whether to replicate a first SKU in the first cluster to the second cluster. In block 602, the cluster generator 202 may determine the order volume of a first SKU in a first cluster. As discussed elsewhere herein, the order volume of the first SKU may indicate the number of orders that contain the first SKU over a defined time period (e.g., 480 orders/70 days).

In block 604, the cluster generator 202 may determine whether the order volume of the first SKU satisfies a threshold of SKU order volume (e.g., greater than or equal to the threshold of to-be-replicated SKU order volume, e.g., 460 orders/70 days). If, in block 604, the cluster generator 202 determines that the order volume of the first SKU does not satisfy the threshold of to-be-replicated SKU order volume, the cluster generator 202 may determine not to replicate the first SKU to the second cluster, because the customer demand of the first SKU is insufficient for the first SKU to be replicated. The method 600 then proceeds to block 626. In block 626, the cluster generator 202 may determine whether there is another first SKU in the first cluster to evaluate.

If in block 604, the cluster generator 202 determines that the order volume of the first SKU satisfies the threshold of to-be-replicated SKU order volume, the method 600 may proceed to block 606, at which the cluster generator 202 may determine the SKU replica threshold of the first SKU based on the order volume of the first SKU. In some embodiments, the cluster generator 202 may reference the cluster algorithm data in the data store 119, determine the order volume range that includes the order volume of the first SKU, and determine the SKU replica threshold corresponding to the order volume range. As an example, the cluster generator 202 may determine that the order volume of the first SKU (e.g., 480 orders/70 days) lies within the order volume range of, for example, [425 orders/70 days, 500 orders/70 days]. In this example, the cluster generator 202 may reference the cluster algorithm data for the clustering level of pick-cell in the data store 119, and determine the SKU replica threshold of the first SKU to be 4 clusters (e.g., the SKU replica threshold may be determined based on computer learning, a table of stored defined values, etc.). Thus, the first SKU may be present in, for example, at most 4 pick-cell clusters throughout multiple clustering cycles. In some embodiments, the SKU replica threshold of the first SKU may be directly proportional to the order volume of the first SKU.

In block 608, the cluster generator 202 may determine a SKU replica count of the first SKU. The SKU replica count of the first SKU may indicate the number of clusters that contain the first SKU and, in some embodiments, may increase by 1 each time the first SKU is replicated to another cluster. In the above example, the cluster generator 202 may determine that the SKU replica count of the first SKU is 3 clusters, and thus the first SKU is already present in 3 pick-cell clusters.

In block 610, the cluster generator 202 may determine whether the SKU replica count of the first SKU satisfies the SKU replica threshold of the first SKU (e.g., less than the SKU replica threshold of the first SKU, such as, 4 clusters).

If, in block 610, the cluster generator 202 determines that the SKU replica count of the first SKU does not satisfy the SKU replica threshold of the first SKU, the cluster generator 202 may determine that the first SKU is already present in the maximum number of clusters that can contain the first SKU as specified by its SKU replica threshold, and thus the first SKU cannot be replicated to another cluster. The method 600 then proceeds to block 626. In block 626, the cluster generator 202 may determine whether there is another first SKU in the first cluster to evaluate.

If, in block 610, the cluster generator 202 determines that the SKU replica count of the first SKU satisfies the SKU replica threshold of the first SKU, the cluster generator 202 may determine that the maximum number of clusters that can contain the first SKU, as specified by its SKU replica threshold, has not been reached, and thus the first SKU can be replicated to another cluster. The method 600 may then proceed to block 612, at which the cluster generator 202 may determine the order volume of a first SKU pair, which SKU pair may include the first SKU of the first cluster and a second SKU of the second cluster, for instance. For example, the order volume of the first SKU pair may indicate the number of orders that contain both the first SKU and the second SKU of the first SKU pair in a defined time period (e.g., 40 orders/70 days).

It should be noted that although the term "pair" is used herein, a pair may include any quantity of items or SKUs representing items. For instance, although a pair is described herein as including two SKUs, it may alternatively include three, four, or another quantity of SKUs.

In block 614, the cluster generator 202 may determine whether the order volume of the first SKU pair satisfies a threshold of SKU pair order volume (e.g., no less than 35 orders/70 days). If in block 614, the cluster generator 202 determines that the order volume of the first SKU pair does not satisfy the threshold of SKU pair order volume, the cluster generator 202 may determine that the customer demand of the first SKU pair, including the first SKU and the second SKU, is insufficient for the first SKU to be replicated to the second cluster. In some instances, the first SKU may still potentially be replicated to the second cluster, such as, if the order volume of second SKU pair, including the first SKU and another second SKU of the second cluster, satisfies the threshold of SKU pair order volume. The method 600 may then proceed to block 624, at which the cluster generator 202 may determine whether there is another second SKU in the second cluster to evaluate.

If in block 614, the cluster generator 202 determines that the order volume of the first SKU pair satisfies the threshold of SKU pair order volume, the method 600 proceeds to block 616, at which the cluster generator 202 may determine the pair replica target of the first SKU pair based on the order volume of the first SKU pair. In some embodiments, the cluster generator 202 may reference the cluster algorithm data in the data store 119, determine the order volume range that includes the order volume of the first SKU pair, and determine the pair replica target corresponding to the order volume range. For instance, continuing the above example, the cluster generator 202 may determine that an order volume of the first SKU pair (e.g., 40 orders/70 days) lies within the order volume range of, for example, [36 orders/70 days, 65 orders/70 days]. In this example, the cluster generator 202 may reference the cluster algorithm data for the clustering level of a pick-cell in the data store 119, and determine the pair replica target of the first SKU pair to be 2 clusters. Thus, in some embodiments, the first SKU pair may be in at least 2 pick-cell clusters in multiple clustering cycles. In some embodiments, the pair replica target of the first SKU pair may be proportional to the order volume of the first SKU pair.

In block 618, the cluster generator 202 may determine the pair replica count of the first SKU pair, which may indicate the number of clusters that contain both the first SKU and the second SKU of the first SKU pair in each cluster. In some embodiments, the pair replica count of the first SKU pair may increase by 1 when the first SKU is replicated to another cluster that contains the second SKU and vice versa. In the above example, the cluster generator 202 may determine that the SKU replica count of the first SKU is 1 cluster, and thus the first SKU pair may be in 1 pick-cell cluster (or other cluster level, depending on the embodiment). In block 620, the cluster generator 202 may determine whether the pair replica count of the first SKU pair satisfies the pair replica target of the first SKU pair (e.g., equal to or higher than the pair replica target of the first SKU pair, e.g., 2 clusters).

If, in block 620, the cluster generator 202 determines that the SKU replica count of the first SKU pair satisfies the pair replica target of the first SKU pair, the cluster generator 202 may determine that the first SKU pair is in the number of clusters as specified by its pair replica target, and thus the first SKU does not need to be replicated to the second cluster containing the second SKU. However, in some instances, the first SKU may still potentially be replicated to the second cluster, such as, if the pair replica target of a second SKU pair including the first SKU and another second SKU of the second cluster has not yet satisfied the pair replica target of the second SKU pair. The method 600 may then proceed to block 624, at which the cluster generator 202 may determine whether there is another second SKU in the second cluster to evaluate.

If in block 620, the cluster generator 202 determines that the SKU replica count of the first SKU pair does not satisfy the pair replica target of the first SKU pair (e.g., the SKU replica count of the first SKU pair is less than the pair replica target of the first SKU pair), the cluster generator 202 may determine that the number of clusters specified by the pair replica target has not been reached, and may determine to replicate the first SKU to the second cluster containing the second SKU. The method 600 may then proceed to block 622, at which the cluster generator 202 may replicate the first SKU of the first cluster to the second cluster.

In some embodiments, responsive to replicating the first SKU (or SKU pair, depending on the embodiment) of the first cluster to the second cluster, the cluster generator 202 may update the SKU replica count of the first SKU in a database (e.g., in the data store 119). For example, the cluster generator 202 may increase the SKU replica count of the first SKU by 1 when the first SKU is replicated to another cluster. In some embodiments, the cluster generator 202 may also update the pair replica count of each SKU pair that includes the first SKU and another SKU of the second cluster. For example, the cluster generator 202 may increase the pair replica count of these SKU pairs by 1, because these SKU pairs are now present in one more cluster (e.g., the second cluster). The method 600 may then proceed to block 626, at which the cluster generator 202 may determine whether there is another first SKU in the first cluster to evaluate.

If, in block 624, the cluster generator 202 determines that the second cluster includes another second SKU to evaluate, the method 600 may proceed to block 612 to determine whether to replicate the first SKU to the second cluster.

If, in block 624, the cluster generator 202 determines that the second cluster does not include another second SKU to evaluate, the method 600 may proceed to block 626, at which, the cluster generator 202 may determine whether there is another first SKU in the first cluster to evaluate, as described above. If, in block 626, the cluster generator 202 determines that the first cluster includes another first SKU to evaluate, the method 600 may proceed to block 602 to determine whether to replicate that another first SKU to the second cluster. If, in block 624, the cluster generator 202 determines that the first cluster does not include another first SKU to evaluate, the method 600 may end or proceed to another operation, depending on the implementation.

In some embodiments, as discussed above, responsive to determining that the SKU replica count of the first SKU satisfies its SKU replica threshold (e.g., is less than the SKU replica threshold of the first SKU) and determining that the pair replica count of the first SKU pair has not yet satisfied the pair replica target of the first SKU pair (e.g., less than the pair replica target of the first SKU pair containing the first and second SKU), the method 600 may replicate the first SKU of the first cluster to the second cluster that contains the second SKU. This implementation may be advantageous, because the first SKU may be replicated across multiple clusters to increase accessibility of SKU pairs while simultaneously limiting excessive storage space consumed by storing the SKU pairs in multiple locations across a storage facility.

As a result, for a pick-cell clustering level, the first SKU pair may be available at one or more pick-cell stations 1310 to facilitate the fulfillment of customer orders including both the first SKU and the second SKU of the first SKU pair, while decreasing retrieval cost to transport the first SKU between the storage area 1350 and a pick-cell station 1310. For other clustering levels (e.g., a storage aisle clustering level, a rack unit clustering level, etc.), the first SKU pair may be available at one or more physical locations (e.g., storage aisles, rack units, etc.) in the storage area 1350 to facilitate the retrieval of the first SKU and the second SKU together, while avoiding cost to replenish the first SKUs at more physical locations in the storage area 1350 than would offer an improvement to the efficiency of the system. In addition, in some embodiments, in order for the first SKU to be added to the second cluster, the order volume of the first SKU may need to satisfy the to-be-replicated SKU order volume threshold and the order volume of the first SKU pair may need to satisfy the SKU pair order volume threshold.

Referring back to FIG. 3, once one or more first SKUs in the first cluster are selectively replicated to the second cluster, in block 312, the cluster generator 202 may determine whether the first cluster and/or the second cluster satisfy one or more defined constraints. In some embodiments, the one or more defined constraints may include a defined threshold cluster size (e.g., less than or equal to 35 SKUs per cluster). In some embodiments, the cluster generator 202 may determine the cluster size of the first cluster, and determine whether the cluster size of the first cluster satisfies the defined threshold cluster size. In addition to the cluster size, other defined constraints may also be applied to the first cluster and/or the second cluster.

If, in block 312, the cluster generator 202 determines that the first cluster satisfies the defined constraint(s), the method 300 may proceed to block 314, at which the cluster generator 202 may determine the first cluster to be a result cluster. In some embodiments, the cluster generator 202 may output the result cluster as an output cluster to be assigned to a physical location of the corresponding location type in the storage facility. In the above example, the cluster generator 202 may output the first cluster as a first pick-cell cluster, which may then be assigned to a first pick-cell station 1310.

If, in block 312, the cluster generator 202 determines that the first cluster does not satisfy the defined constraint(s), the cluster generator 202 may determine, for example, the first cluster to be a temporary cluster on which the cluster generator 202 may perform additional clustering cycle(s) to further divide the temporary cluster thereby generating result cluster(s). The method 300 may then proceed to block 316, at which the cluster generator 202 may append the first cluster to the end position of the cluster queue. As discussed elsewhere herein with regard to the cluster model and the cluster queue, determining the cluster that occupies the start position of the cluster queue to be the processing cluster and appending temporary clusters generated from the processing cluster to the end position of the cluster queue (e.g., using breadth first traversal of cluster level depths) may be advantageous, because the replication budgets specified by the SKU replica threshold and the pair replica target can be properly allocated between the temporary clusters having the same clustering depth in the cluster model, rather than being quickly exhausted through multiple temporary clusters of various clustering depths in the same branch of the cluster model. Accordingly, items may be duplicated to different pick-cells, aisles, etc., of a storage facility rather than the duplicates being stored in a single aisle, but in different racks, for example.

If, in block 312, the cluster generator 202 determines that the second cluster satisfies the defined constraint(s) (e.g., the cluster size of the second cluster satisfies the defined threshold cluster size), the method 300 may proceed to block 314, at which the cluster generator 202 may determine the second cluster to be another result cluster. In some embodiments, the cluster generator 202 may then output the result cluster as another output cluster to be assigned to a physical location in the storage facility. For example, the cluster generator 202 may output the second cluster as a second pick-cell cluster, which may then be assigned to a second pick-cell station 1310. In some embodiments, if in block 312, the cluster generator 202 determines that the second cluster violates the defined constraint(s), the cluster generator 202 may determine the second cluster to be another temporary cluster and the method 300 may then proceed to block 316, at which the cluster generator 202 may append the second cluster to the end position of the cluster queue.

In block 318, the cluster generator 202 may determine whether there is another cluster (e.g., a temporary cluster) in the cluster queue to process. If, in block 318, the cluster generator 202 determines that the cluster queue includes another cluster to process, the method 300 may proceed to block 306 to determine the temporary cluster that occupies the start position of the cluster queue to be the next processing cluster, which may then be processed to generate the temporary cluster(s) and/or the result cluster(s) as discussed above.

Figure 4A:
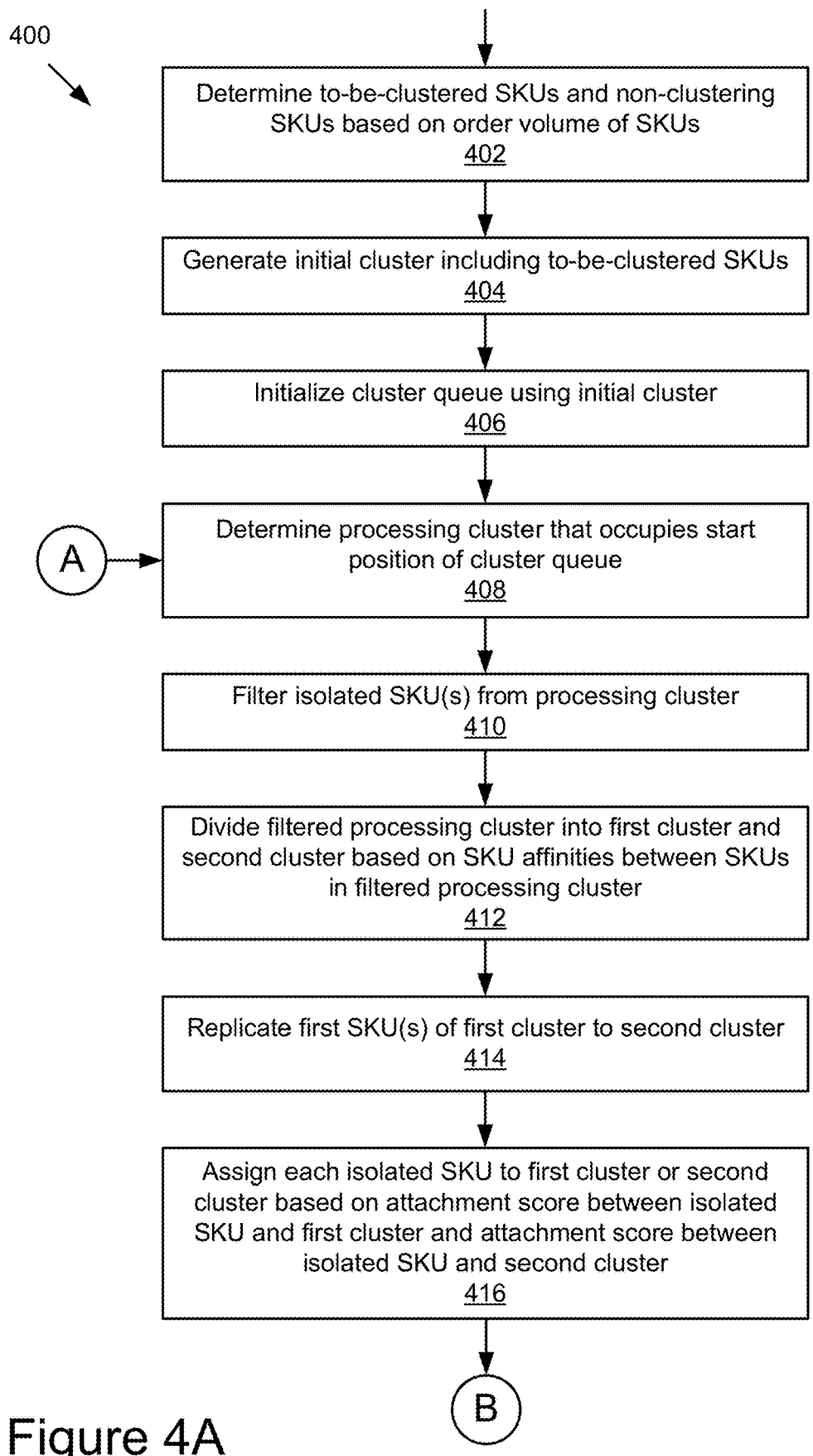
FIGS. 4A and 4B illustrate a flowchart of an example method for generating clusters to be assigned to physical locations within a storage area of the storage facility.
Figure 4B:
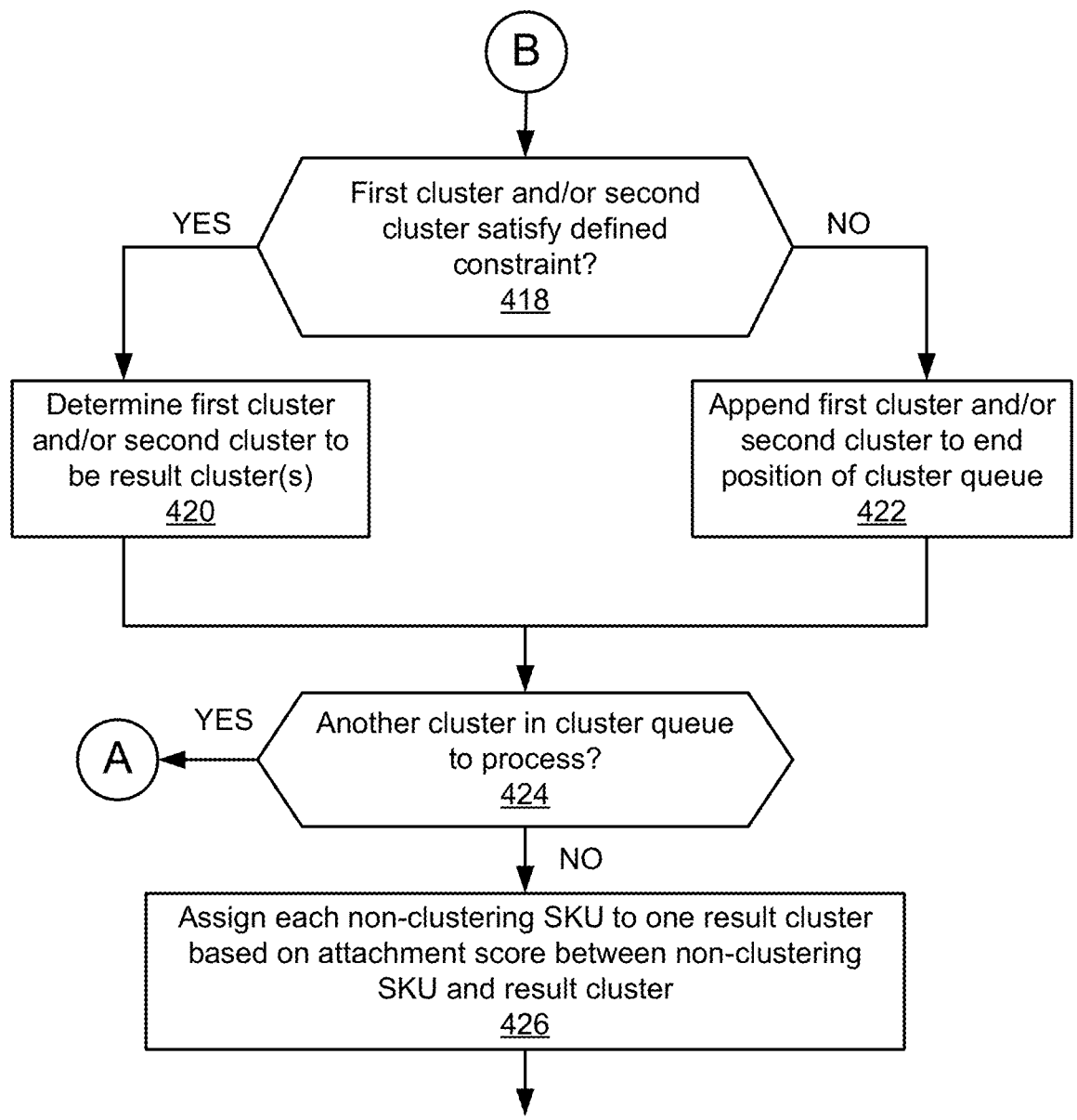

FIGS. 4A and 4B illustrate a flowchart of an example method 400 for generating clusters to be assigned to various physical locations within the storage area of the storage facility. In some instances, for the clustering level of storage aisle, the method 400 may cluster one or more SKUs associated with the storage facility into one or more aisle clusters, which may each then be assigned to a storage aisle 1402. In some instances, for a rack unit clustering level, the method 400 may cluster one or more SKUs associated with a storage aisle 1402 into one or more rack clusters, which may then be assigned to one or more rack units 1430 within the storage aisle 1402. In some embodiments, the one or more SKUs associated with the storage aisle 1402 may include some or all SKUs associated with and/or present in the storage aisle 1402. In some instances, for a mini-pallet clustering level, the method 400 may cluster one or more SKUs associated within a rack unit 1430 into one or more mini-pallet clusters, which may then be assigned to one or more mini-pallets 1440 in the rack unit 1430. In some embodiments, the one or more SKUs associated with the rack unit 1430 may include some or all SKUs associated with and/or present in the rack unit 1430. In order to simplify the description herein, the method 400 is discussed with regard to a storage aisle clustering level, although it should be noted that other clustering levels (e.g., pick-cell station, rack unit, etc.) may be performed in the same or similar manner.

In some embodiments, in block 402, the cluster generator 202 may determine one or more to-be-clustered SKUs and one or more non-clustering SKUs based on the order volume of these SKUs. For example, the to-be-clustered SKUs may have an order volume satisfying a to-be-clustered SKU order volume threshold specified for the storage aisle clustering level (e.g., greater than or equal to 75 orders/70 days) while the non-clustering SKUs may not satisfy the threshold. In block 404, the cluster generator 202 may generate an initial cluster, which may include the to-be-clustered SKUs and exclude the non-clustering SKUs, for example. In some instances, the non-clustering SKUs may not be in the result cluster, the temporary clusters generated from the initial cluster at various clustering depths, or the processing cluster selected from the temporary clusters. For example, excluding non-clustering SKUs having insufficient order volume from the SKUs being clustered may be advantageous, because it can avoid degrading the accuracy of the SKU clustering.

In block 406, the cluster generator 202 may initialize a cluster queue using the initial cluster, for example, by including the initial cluster at the start position of the cluster queue. In block 408, the cluster generator 202 may determine a processing cluster. For instance, the cluster generator 202 may determine or otherwise define the cluster that occupies the start position of the cluster queue to be the processing cluster. Thus, in the first clustering cycle, the processing cluster may be the initial cluster and, in some embodiments, the processing cluster may be updated in subsequent clustering cycles.

In some embodiments, in block 410, the cluster generator 202 may filter one or more isolated SKUs from the processing cluster. In some embodiments, the isolated SKU may be ordered separately without other SKUs or may be ordered together with different SKUs with insufficient frequency (e.g., based on a defined threshold) to have sufficient SKU affinity (e.g., below a threshold affinity or level of data) with a particular SKU being established. For instance, the cluster generator 202 may determine one or more isolated SKUs in the processing cluster based on the SKU affinities of these SKUs. For example, for each SKU in the processing cluster, the cluster generator 202 may determine one or more SKU affinities between the SKU and one or more other SKUs in the processing cluster. For example, as discussed above, the SKU affinity between two SKUs may indicate the frequency that two (or some other quantity) SKUs are co-present in the same customer orders. In some embodiments, the cluster generator 202 may determine whether the one or more SKU affinities between the SKU and the one or more other SKUs in the processing cluster satisfy a defined threshold SKU affinity (e.g., less than 0.1). Responsive to determining that the one or more SKU affinities between the SKU and the one or more other SKUs in the processing cluster satisfy the defined threshold SKU affinity, the cluster generator 202 may determine or otherwise define the SKU as an isolated SKU in the processing cluster. The cluster generator 202 may then filter the isolated SKU from the processing cluster. Filtering the isolated SKU having insufficient SKU affinities with other SKUs from the processing cluster may be advantageous, for example, because it can avoid degrading the accuracy of the SKU clustering.

In some embodiments, in block 412, the cluster generator 202 may divide the filtered processing cluster, for example, into a first cluster and a second cluster based on the SKU affinities between the SKUs in the filtered processing cluster. In some embodiments, dividing the filtered processing cluster into the first cluster and the second cluster may be performed in a manner similar to the method 500 discussed above with reference to FIG. 5.

In block 414, the cluster generator 202 may selectively replicate one or more first SKUs in the first cluster to the second cluster, so that both the first and second cluster may contain the one or more first SKUs, which may be performed, for example, as described in reference to the method 600 in FIG. 6 discussed above.

In some embodiments, in block 416, the cluster generator 202 may assign one or more isolated SKUs either to a cluster (e.g., the first cluster or to the second cluster), so that the one or more isolated SKUs may be stored in the storage facility. For example, for an isolated SKU filtered from the processing cluster, the cluster generator 202 may compute a first attachment score between the isolated SKU and the first cluster, which first attachment score may indicate a demand correlation between the isolated SKU and the first cluster, as described above. For example, the cluster generator 202 may determine the order volumes of one or more SKU pairs that include the isolated SKU and a SKU in the first cluster. The cluster generator 202 may then compute a first attachment score between the isolated SKU and the first cluster based on the order volumes of the SKU pairs. For example, the cluster generator 202 may compute the first attachment score between the isolated SKU and the first cluster to be the total order volume of the SKU pairs, in which each SKU pair may include the isolated SKU and one SKU in the first cluster. In some embodiments, the cluster generator 202 may also compute a second attachment score between the isolated SKU and the second cluster in the same manner.

In some embodiments, the cluster generator 202 may assign the isolated SKU to one of the first cluster and the second cluster based on the first attachment score between the isolated SKU and the first cluster, and the second attachment score between the isolated SKU and the second cluster. For example, the cluster generator 202 may determine that the first attachment score between the isolated SKU and the first cluster is higher than the second attachment score between the isolated SKU and the second cluster. The cluster generator 202 may therefore assign the isolated SKU to the first cluster.

In some embodiments, once the isolated SKUs are assigned clusters, in block 418, the cluster generator 202 may determine whether the cluster(s) (e.g., the first cluster and/or the second cluster) satisfy one or more defined constraints. For example, the cluster generator 202 may determine the cluster size of the first cluster and the second cluster. In some instances, the cluster generator 202 may determine whether the cluster size of the first cluster satisfies a defined threshold cluster size, and whether the cluster size of the second cluster satisfies the defined threshold cluster size (e.g., less than or equal to 100 SKUs per aisle cluster). In addition to the cluster size, other constraints may also be applied to the first cluster and/or the second cluster.

If, in block 418, the cluster generator 202 determines that the first cluster satisfies the defined constraint(s), the method 400 may proceed to block 420, at which the cluster generator 202 may determine or otherwise define the first cluster to be a result cluster. If, in block 418, the cluster generator 202 determines that the first cluster does not satisfy the constraint(s), the cluster generator 202 may determine the first cluster to be a temporary cluster for which the cluster generator 202 may perform additional clustering cycle(s) to generate the result clusters. The method 400 may then proceed to block 422, at which the cluster generator 202 may append the first cluster to the end position of the cluster queue, for example, to perform additional processing on the cluster at a later point. If, in block 418, the cluster generator 202 determines that the second cluster does not satisfy the defined constraint(s), the cluster generator 202 may determine the second cluster to be another temporary cluster, and the method 400 may then proceed to block 422, at which the cluster generator 202 may append the second cluster to the end position of the cluster queue. If, in block 418, the cluster generator 202 determines that the second cluster satisfies the defined constraint(s), the method 400 may proceed to block 420, at which the cluster generator 202 may determine the second cluster to be another result cluster.

In some embodiments, in block 424, the cluster generator 202 may determine whether there is another cluster (e.g., temporary cluster) in the cluster queue to process. If in block 424, the cluster generator 202 determines that the cluster queue includes another temporary cluster to process, the method 400 may proceed to block 408 to determine or otherwise define the temporary cluster that occupies the start position of the cluster queue to be the next processing cluster, and that the processing cluster may be processed to generate the temporary cluster(s) and/or the result cluster(s), for example, as discussed above. If, in block 424, the cluster generator 202 determines that the cluster queue does not include another temporary cluster to process, the method 400 may then proceed to block 426.

In some embodiments, in block 426, as the to-be-clustered SKUs in the initial cluster may now be grouped into one or more result clusters, the cluster generator 202 may assign one or more non-clustering SKUs to the one or more result clusters to generate output clusters. In some embodiments, the cluster generator 202 may compute one or more attachment scores between the non-clustering SKU and the one or more result clusters to assign non-clustering SKUs to clusters or otherwise to areas of a storage facility.

As an example, one or more result clusters may include a first and second cluster, for instance, a first and second result cluster may be clusters that satisfy a defined constraint (e.g., as discussed above). In this example, for each non-clustering SKU, the cluster generator 202 may compute a first attachment score which may indicate the demand correlation between the non-clustering SKU and the first result cluster. For example, the cluster generator 202 may determine order volumes of one or more SKU pairs, each of which may include the non-clustering SKU and one SKU in the first result cluster, and the cluster generator 202 may then compute the first attachment score between the non-clustering SKU and the first result cluster based on the order volumes of these SKU pairs. For example, the cluster generator 202 may compute the first attachment score between the non-clustering SKU and the first result cluster to be the total order volume of the SKU pairs, in which a SKU pair may include the non-clustering SKU and one SKU in the first result cluster. In some embodiments, the cluster generator 202 may also compute a second attachment score between the non-clustering SKU and the second result cluster in a similar manner.

In some embodiments, the cluster generator 202 may assign one or more non-clustering SKU to a result cluster among the one or more result clusters based on the attachment scores between the non-clustering SKU and the one or more result clusters. For instance, continuing the above example, the cluster generator 202 may determine that the first attachment score between the non-clustering SKU and the first result cluster is higher than the second attachment score between the non-clustering SKU and the second result cluster, in response to which the cluster generator 202 may assign the non-clustering SKU to the first result cluster.

In some embodiments, once the non-clustering SKUs are assigned to the one or more result clusters, the cluster generator 202 may determine or otherwise define the one or more result clusters to be one or more output clusters. For instance, the cluster generator 202 may output an output cluster as an aisle cluster, which may then be assigned to a storage aisle 1402 in the storage facility. As discussed elsewhere herein, the cluster generator 202 may perform one or more operations of the method 400 to cluster SKUs associated with a storage aisle 1402 into rack clusters in the same manner, and may assign a rack cluster to a rack unit 1430 within the storage aisle 1402, for example. The cluster generator 202 may also perform the method 400 to cluster one or more SKUs associated with a rack unit 1430 into one or more mini-pallet clusters in the same manner, and may then assign a mini-pallet cluster to a mini-pallet 1440 within the rack unit 1430, for example.

Figure 7A:
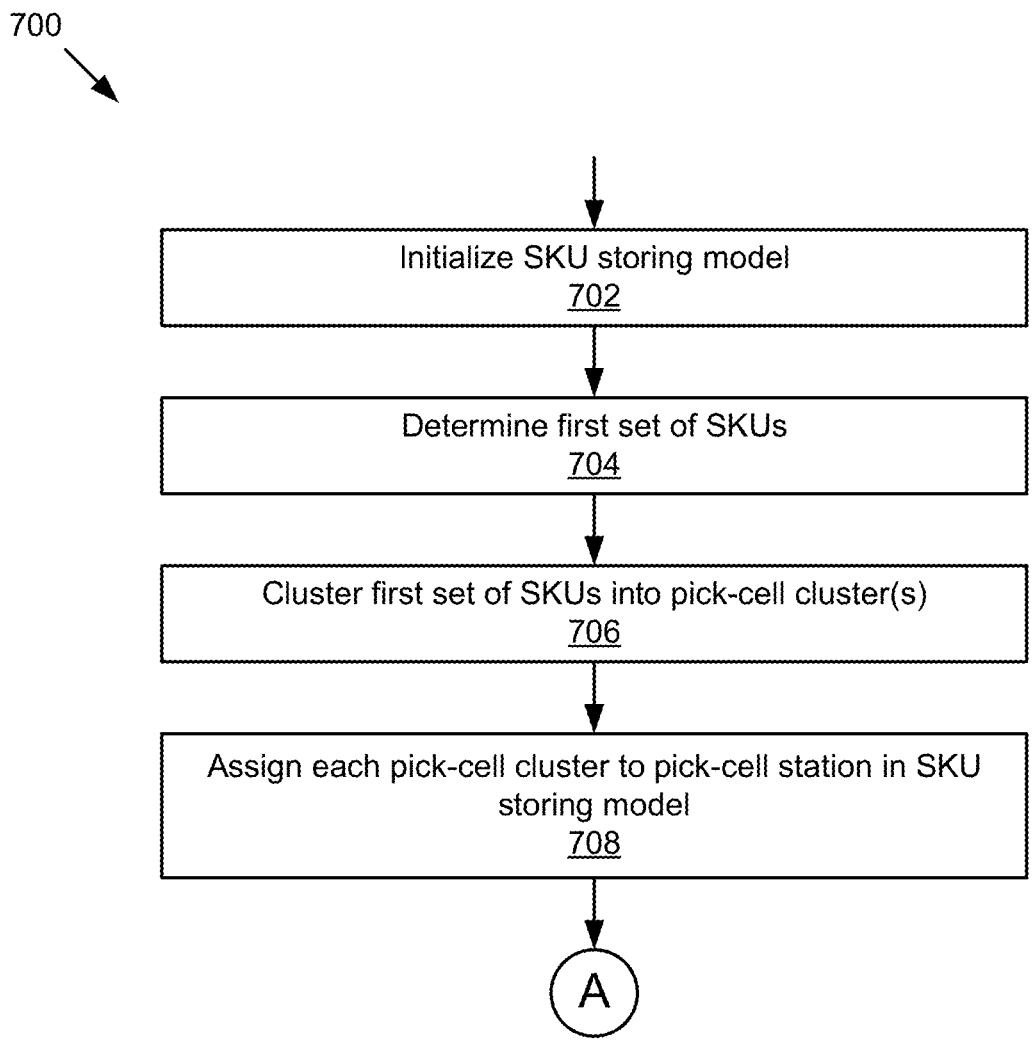
FIGS. 7A and 7B illustrate a flowchart of an example method for generating a SKU storing model.
Figure 7B:
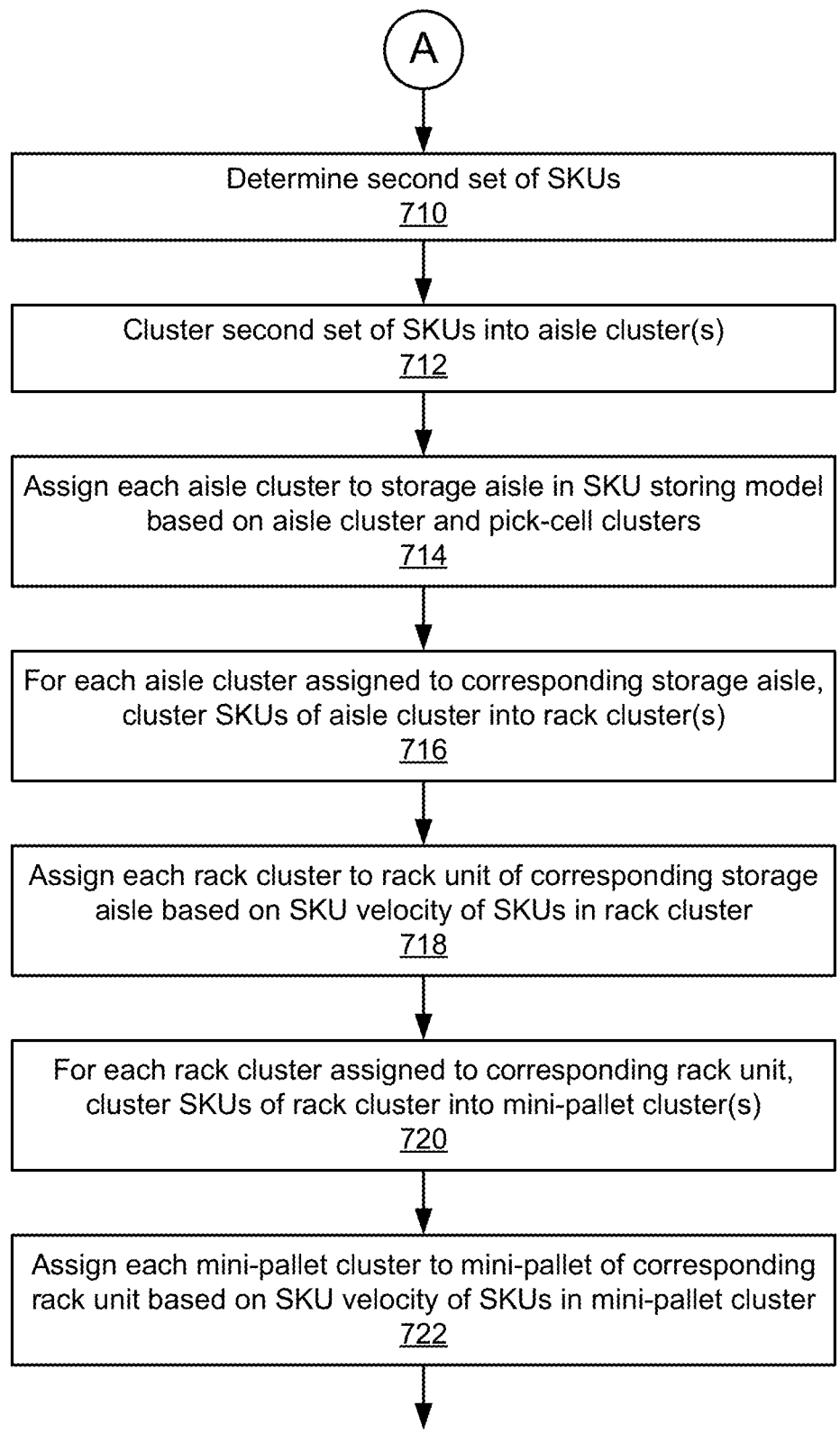

FIGS. 7A and 7B illustrate a flowchart of an example method 700 for generating a SKU storing model. For instance, the SKU storing model may map output clusters generated at a clustering level to physical locations of the corresponding location types in the storage facility. For example, the SKU storing model may map each pick-cell cluster to a pick-cell station 1310, map each aisle cluster to a storage aisle 1402, map each rack cluster to a rack unit 1430, and/or map each mini-pallet cluster to a mini-pallet 1440, etc.

In block 702, the cluster location manager 204 may initialize the SKU storing model. The SKU storing model may describe the layout structure of various areas in the storage facility, which may include, for example, the storage area 1350 and the pick-to-carton area 1360. In some embodiments, as shown in FIG. 14, the storage area 1350 may include one or more storage aisles 1402, each storage aisle 1402 including one or more rack units 1430, and each rack unit 1430 holding one or more mini-pallet 1440, for example. The pick-to-carton area 1360 may include one or more pick-cell stations 1310 at which the customer orders may be fulfilled as described in reference to FIG. 14.

In block 704, the cluster generator 202 may determine a first set of SKUs from the SKUs associated with the storage facility. In some embodiments, the cluster generator 202 may determine the first set of SKUs based on the order volumes of the SKUs in the first set of SKUs. For example, the SKUs in the first set of SKUs may have the order volume satisfying a to-be-clustered SKU order volume threshold specified for the clustering level of pick-cell (e.g., greater than or equal to 450 orders/70 days). Thus, the first set of SKUs may include one or more SKUs that have high (e.g., beyond a threshold) order volume or SKU velocity (e.g., frequency with which an order is fulfilled in the storage facility) among the SKUs of the storage facility.

In some embodiments, in block 706, the cluster generator 202 may cluster the first set of SKUs into one or more pick-cell clusters. In some embodiments, the cluster generator 202 may perform the method 300 discussed above with reference to FIG. 3 to generate one or more output clusters (e.g., an output cluster may be a pick-cell cluster) from the first set of SKUs. For example, as discussed elsewhere herein, the cluster generator 202 may divide the first set of SKUs into a first cluster and a second cluster based on the SKU affinities between the one or more SKUs in the first set of SKUs. The cluster generator 202 may selectively replicate one or more first SKUs of the first cluster to the second cluster based on the demand correlation between each first SKU of the first cluster and a second SKU of the second cluster. In some instances, responsive to replicating the first SKU(s) of the first cluster to the second cluster, the cluster generator 202 may determine whether the first cluster and the second cluster satisfy the defined constraint(s) (e.g., defined threshold cluster size). If the cluster generator 202 determines that the first cluster and/or the second cluster satisfy the defined constraint(s), the cluster generator 202 may determine or otherwise define the first cluster and/or the second cluster to be result clusters. The cluster generator 202 may then output the first cluster and/or second clusters as a first and/or second pick-cell clusters, respectively. If the cluster generator 202 determines that the first cluster and/or the second cluster violate or do not satisfy the defined constraint(s), the cluster generator 202 may determine the first cluster and/or the second cluster to be temporary clusters. The cluster generator 202 may then process these temporary clusters in order to generate the result cluster(s) to be output as a pick-cell cluster.

In block 708, the cluster location manager 204 may assign each pick-cell cluster to a pick-cell station 1310 in the SKU storing model. In some embodiments, the cluster location manager 204 may assign pick-cell clusters to pick-cell stations 1310 randomly, based on proximity to certain items corresponding to SKUs, based on pick-cell station 1310 and/or cluster attributes, based on a pick-cell station 1310 back log, or based on other factors.

Thus, by clustering SKUs that have high (e.g., beyond a threshold) SKU velocity based on the SKU affinities between these SKUs to generate the pick-cell clusters, the SKUs that are frequently present in the customer orders and frequently co-present in the same customer order may be included in the same pick-cell cluster. Accordingly, correlated SKUs may be available in the same pick-cell station 1310, and thus the fulfillment of the customer orders that contain two or more of correlated SKUs may be quickly fulfilled. Additionally, in some instances, the first SKU may be replicated across multiple pick-cell clusters and such replication can be optimally controlled by the SKU replica threshold and the pair replica target as discussed above, so that the first SKU may be available at multiple pick-cell stations 1310, and thus the customer orders that contain the first SKU may be fulfilled in parallel, while decreasing retrieval cost to transport the SKUs between the storage area 1350 and more pick-cell stations 1310 than necessary.

In block 710, the cluster generator 202 may determine a second set of SKUs (e.g., including SKUs associated with and/or located in a storage facility). As discussed elsewhere herein, the SKUs associated with the storage facility may include all SKUs present in the storage facility. In block 712, the cluster generator 202 may cluster the second set of SKUs into one or more aisle clusters. In some embodiments, the cluster generator 202 may perform one or more operations of the method 400 discussed above with reference to FIGS. 4A and 4B to generate one or more output clusters from the second set of SKUs, each output cluster may be one aisle cluster, for example.

For example, as discussed elsewhere herein, the cluster generator 202 may determine an initial cluster from the second set of SKUs, the initial cluster may include the to-be-clustered SKUs having sufficient order volume and exclude the non-clustering SKUs having insufficient order volume. The cluster generator 202 may filter from the initial cluster the isolated SKUs having insufficient SKU affinities with other SKUs of the initial cluster. The cluster generator 202 may then divide the filtered initial cluster into a first cluster and a second cluster based on the SKU affinities between the one or more SKUs in the filtered initial cluster. The cluster generator 202 may selectively replicate one or more first SKUs of the first cluster to the second cluster based on the demand correlation between each first SKU of the first cluster and a second SKU of the second cluster.

In this example, responsive to replicating the first SKU(s) of the first cluster to the second cluster, the cluster generator 202 may assign each isolated SKU to the first cluster or to the second cluster, based on the demand correlation (e.g., an affinity based on co-occurrence in orders, as described above) between the isolated SKU and the SKUs of the first cluster and the demand correlation between the isolated SKU and the SKUs of the second cluster. Responsive to assigning each isolated SKUs to one of the first cluster and the second cluster, the cluster generator 202 may determine whether the first cluster and the second cluster satisfy the defined constraint(s) (e.g., a threshold cluster size). If the cluster generator 202 determines that the first cluster and/or the second cluster satisfy the defined constraint(s), the cluster generator 202 may determine the first cluster and/or the second cluster to be the result cluster(s). If the cluster generator 202 determines that the first cluster and/or the second cluster do not satisfy the defined constraint(s), the cluster generator 202 may determine the first cluster and/or the second cluster to be the temporary clusters. The cluster generator 202 may then process these temporary clusters to generate the result cluster(s). Once the result clusters are determined, the cluster generator 202 may assign each non-clustering SKU to one of the result clusters based on the demand correlation between the non-clustering SKU and the SKUs of the result cluster. Responsive to assigning each non-clustering SKU to one of the result clusters, the cluster generator 202 may determine output clusters based on result clusters, as described above. For example, the cluster generator 202 may output an output cluster as an aisle cluster.

Figure 8A:
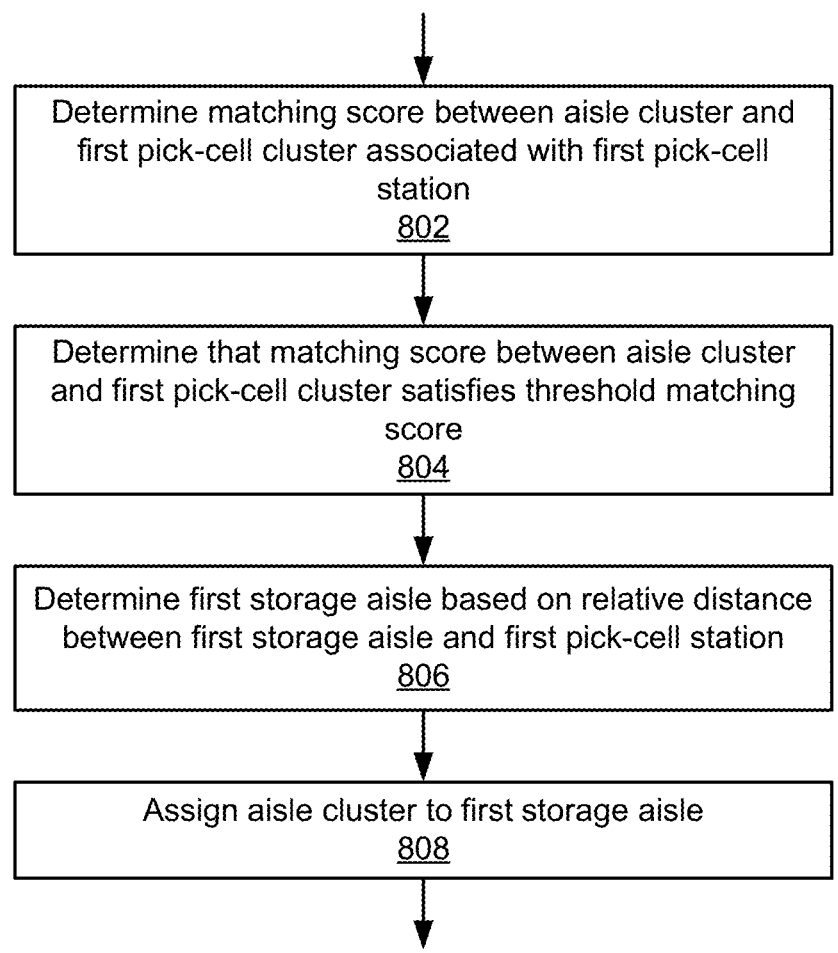
FIG. 8A is a flowchart of an example method for assigning aisle clusters to storage aisles.

In block 714, the cluster location manager 204 may assign an aisle cluster to a corresponding storage aisle 1402 in the SKU storing model based on the aisle cluster and one or more pick-cell clusters. A flowchart of an example method 800 for assigning an aisle cluster to a corresponding storage aisle is illustrated in FIG. 8A. In some embodiments, in block 802, the cluster location manager 204 may determine a matching score between the aisle cluster and a first pick-cell cluster among the one or more pick-cell clusters. For example, the matching score may indicate the number of matching SKUs between the aisle cluster and the first pick-cell cluster (e.g., 28 matching SKUs), for example, each matching SKU may be present in the aisle cluster and also present in the first pick-cell cluster.

In block 804, the cluster location manager 204 may determine whether the matching score between the aisle cluster and the first pick-cell cluster satisfies a defined threshold matching score (e.g., more than 25 matching SKUs).

Responsive to determining that the matching score between the aisle cluster and the first pick-cell cluster satisfies the defined threshold matching score, the cluster location manager 204 may determine the first pick-cell station 1310 to which the first pick-cell cluster is assigned, and assign the aisle cluster to a storage aisle 1402 located proximate to the first pick-cell station 1310. For example, in block 806, the cluster location manager 204 may determine a first storage aisle 1402 from the one or more storage aisles 1402 based on a relative distance between the first storage aisle 1402 and the first pick-cell station 1310. In some embodiments, the cluster location manager 204 may determine the first storage aisle 1402 that has the lowest relative distance to the first pick-cell station 1310. In some embodiments, the cluster location manager 204 may determine the first storage aisle 1402 that has a relative distance to the first pick-cell station 1310 satisfying a defined threshold distance (e.g., less than 3 m). In block 808, the cluster location manager 204 may assign the aisle cluster to the first storage aisle 1402. This implementation is particularly advantageous, because it can significantly reduce the travel distance of the picking-AGVs 107 as the picking-AGVs 107 transport the mini-pallets between the first storage aisle 1402 and the first pick-cell station 1310.

Referring back to FIG. 7B, in block 716, for each aisle cluster assigned to the corresponding storage aisle 1402, the cluster generator 202 may cluster the SKUs of the aisle cluster into one or more rack clusters. In some embodiments, the cluster generator 202 may perform one or more operations of the method 400 discussed above with reference to FIGS. 4A and 4B to output rack clusters from the SKUs of the aisle cluster.

In block 718, the cluster location manager 204 may assign a rack cluster to a corresponding rack unit 1430 of the storage aisle 1402 based on SKU velocities of the SKUs in the rack cluster. For example, a first aisle cluster may be assigned to a first storage aisle 1402, which may include one or more rack units 1430. For instance, the cluster generator 202 may cluster the SKUs of the first aisle cluster into one or more rack clusters, and the cluster location manager 204 may then assign each rack cluster to a corresponding rack unit 1430 of the first storage aisle 1402 in the SKU storing model.

Figure 8B:
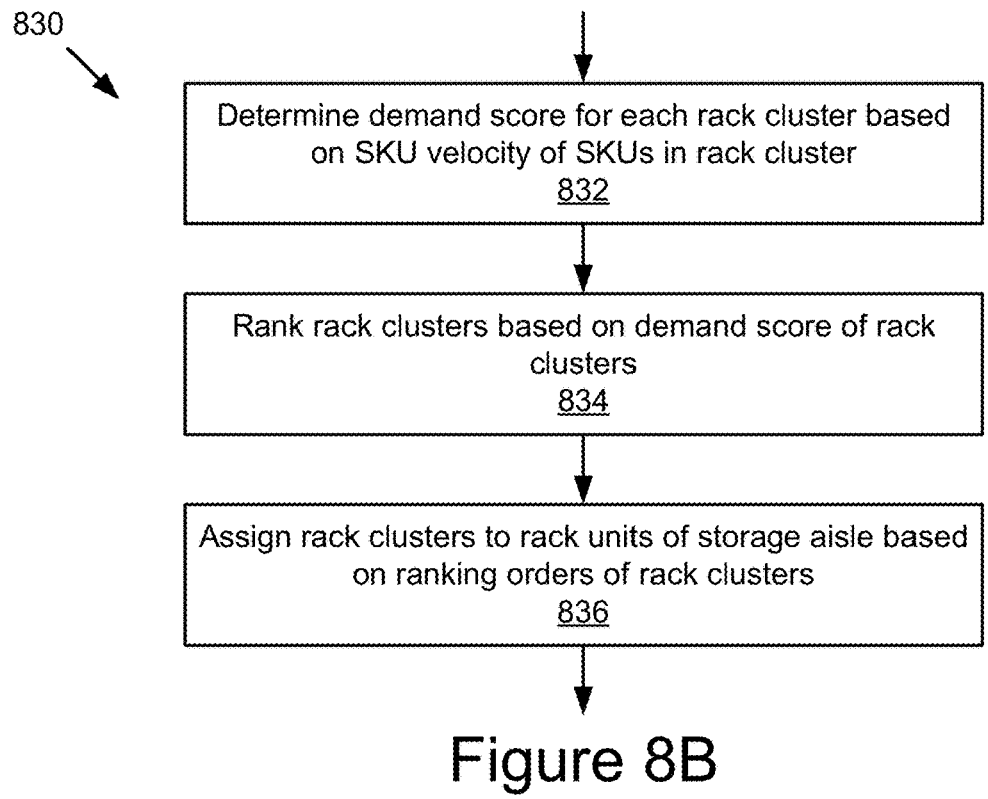
FIG. 8B is a flowchart of an example method for assigning rack clusters to rack units.

FIG. 8B illustrates a flowchart of an example method 830 for assigning rack clusters to corresponding rack units. In block 832, the cluster location manager 204 may determine a demand score for each rack cluster based on the SKU velocity of the SKUs in the rack cluster. As discussed elsewhere herein, the SKU velocity of a SKU may indicate the order volume of the SKU, and thus reflecting the customer demand of the SKU. In some embodiments, the cluster location manager 204 may determine the SKU velocity of the SKUs in the rack cluster, and determine the demand score of the rack cluster to be the average value of the SKU velocities.

In block 834, the cluster location manager 204 may rank the one or more rack clusters based on a demand score of the one or more rack clusters. In some embodiments, the cluster location manager 204 may rank the rack clusters in decreasing order of demand score. For example, in some embodiments, the rack cluster with the highest demand score may have the lowest ranking order (e.g., the ranking order of "1" may be ranked first) and rack clusters with decreasing demand scores may have increasing ranking orders. For instance, a first rack cluster having the demand score of 280 may be ranked before a second rack cluster having the demand score of 220.

In block 836, the cluster location manager 204 may assign the one or more rack clusters to the one or more rack units 1430 of the storage aisle 1402 based on the ranking orders of the one or more rack clusters. In some embodiments, each rack cluster may be assigned to the rack unit 1430 that has the relative distance to the front end of the storage aisle 1402 proportional to the ranking order of the rack cluster. For example, a first rack cluster having a ranking order of 1 may be assigned to the first rack unit 1430 having the lowest distance to the front end of the storage aisle 1402, and a second rack cluster having a ranking order of 3 may be assigned to the third rack unit 1430 having the third lowest distance to the front end of the storage aisle 1402, etc. In some embodiments, a front end of the storage aisle 1402 may have the lowest distance to the pick-to-carton area 1360 in the traffic direction of the storage aisle 1402. This implementation may be advantageous, for example, because items corresponding to high demand SKUs may be stored closer to pick-cell stations 1310, so they may be transported a shorter distance, thereby increasing the efficiency of AGVs carrying the items (e.g., the AGV may carry a mini pallet holding the item). For example, a rack cluster having a higher demand score may include SKUs with higher customer demand, so they may be transported between the storage aisle 1402 and the pick-cell stations 1310 in the pick-to-carton area 1260 frequently, so locating the items closer (e.g., in a closer rack unit 1430) may reduce the travel distance of picking AGVs 107 transporting the items between the storage aisle 1402 and the pick-cell stations 1310.

Referring back to FIG. 7B, in block 720, for one or more rack clusters assigned to the corresponding rack unit, the cluster generator 202 may cluster the SKUs of the rack cluster into one or more mini-pallet clusters. In some embodiments, the cluster generator 202 may perform one or more operations of the method 400 discussed above with reference to FIGS. 4A and 4B to generate one or more output clusters from the SKUs of the rack cluster, for instance, each output cluster may be one mini-pallet cluster. In block 722, the cluster location manager 204 may assign a mini-pallet cluster to a corresponding mini-pallet 1440 of the rack unit 1430 based on the SKU velocity of the SKUs in the mini-pallet cluster. For example, if a first rack cluster is assigned to a first rack unit 1430 in the first storage aisle 1402, the first rack unit 1430 may include one or more mini-pallets 1440. For instance, the cluster generator 202 may cluster the SKUs of the first rack cluster into one or more mini-pallet clusters, and the cluster location manager 204 may then assign a mini-pallet cluster to a corresponding mini-pallet 1440 of the first rack unit 1430 in the first storage aisle 1402.

Figure 8C:
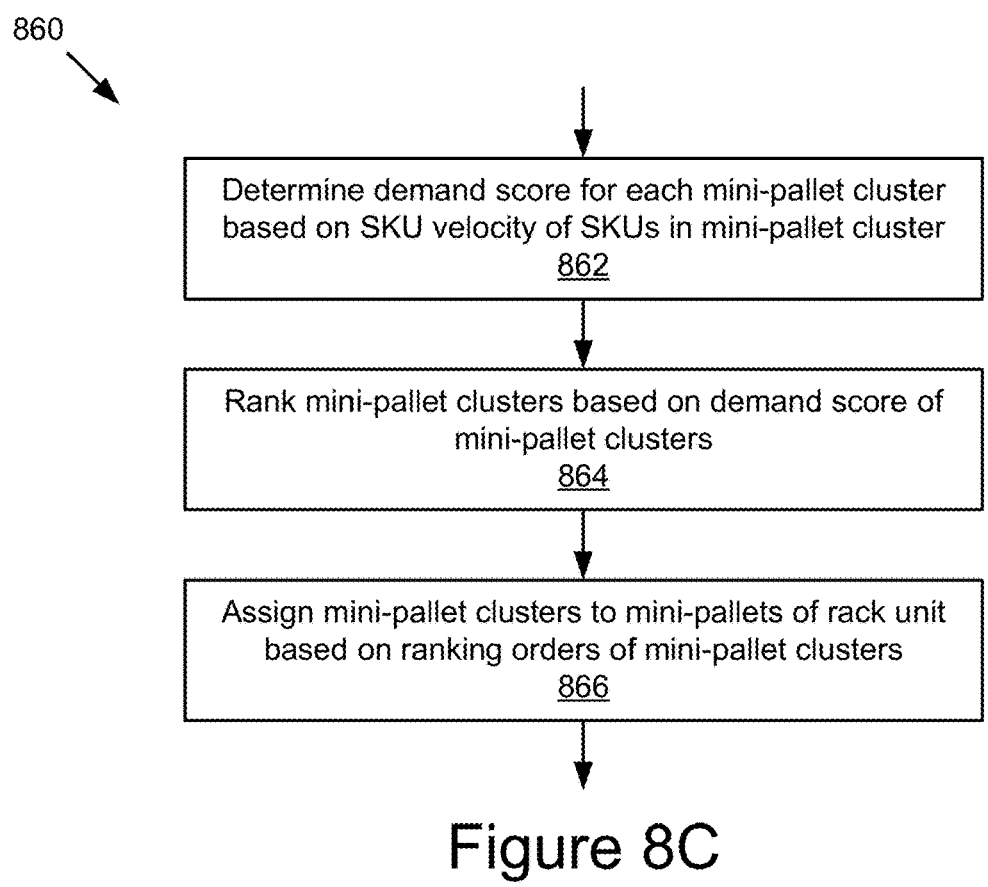
FIG. 8C is a flowchart of an example method for assigning mini-pallet clusters to mini-pallets.

FIG. 8C illustrates a flowchart of an example method 860 for assigning mini-pallet clusters to corresponding mini-pallets. In some embodiments, assigning mini-pallet clusters to corresponding mini-pallets may be performed in a manner similar to assigning rack clusters to corresponding rack units. For example, in block 862, the cluster location manager 204 may determine a demand score for a mini-pallet cluster based on the SKU velocity of the SKUs in the mini-pallet cluster. In some embodiments, the cluster location manager 204 may determine the SKU velocity of the SKUs in the mini-pallet cluster, and determine the demand score of the mini-pallet cluster to be the average value of these SKU velocities. In block 864, the cluster location manager 204 may rank the one or more mini-pallet clusters based on the demand score of the one or more mini-pallet clusters.

In block 866, the cluster location manager 204 may assign the one or more mini-pallet clusters to the one or more mini-pallets 1440 of the rack unit 1430 based on the ranking orders of the one or more mini-pallet clusters. In some embodiments, a mini-pallet cluster may be assigned to the mini-pallet 1440 that has the relative distance to the front end of the rack unit 1430 proportional to the ranking order of the mini-pallet cluster. For example, a front end of the rack unit 1430 may be the end position of the rack unit 1430 with the lowest distance to the pick-to-carton area 1360, for example, in the traffic direction of the storage aisle 1402. This implementation may be advantageous because items corresponding to SKUs with higher demand scores may be stored closer to pick-cell stations 1310, thereby reducing the travel distance of picking-AGVs 107 and thereby increasing their efficiency and utilization.

For example, by clustering SKUs in the storage facility at multiple clustering levels as discussed above, the SKUs may be organized in the storage area 1350 to increase efficiency the picking tasks performed by picking-AGVs 107. For example, the SKUs may be clustered based on SKU affinities to generate aisle clusters, the SKUs of an aisle cluster may be clustered based on SKU affinities to generate rack clusters, and the SKUs of a rack cluster may be clustered based on SKU affinities to generate mini-pallet clusters. Accordingly, in some embodiments, the SKUs that are frequently (e.g., satisfying a threshold frequency) co-present in the same customer order may be included in the same aisle cluster and may be stored in the same storage aisle 1402, and thus may be retrieved in one trip of the picking-AGV 107 along the storage aisle 1402, or using trips having shorter distance, depending on the embodiment. Similarly, SKUs that are frequently co-present in orders may be included in the same rack cluster and may be stored in the same rack unit 1430, and thus may, in some embodiments, be retrieved in one stop of the picking-AGV 107 at a stop position 1530 associated with a rack unit 1430. Similarly, at a mini-pallet clustering level, SKUs that are frequently co-present in the orders may be included in the same mini-pallet cluster and may be stored in the same mini-pallet 1440, and thus can be retrieved in one retrieval of a mini-pallet performed by the picking-AGV 107. Accordingly, because SKUs ordered in the same orders are located in nearby to one another in the storage facility, the distance traveled by AGVs can be minimized and, in some instances, stops of the AGVs can be minimized because, for example, an AGV may retrieve multiple items and/or mini-pallets at a single rack unit. This may, as described above, increase efficiency of AGVs as well as reduce computational resources consumed by an AGV (or AGV control system) to retrieve items at each stop.

In some instances, as discussed above, a first SKU may be replicated across multiple aisle clusters, rack clusters, and/or mini-pallet clusters, in which such replications can be controlled by the SKU replica threshold and the pair replica target specified depending on the clustering levels. Thus, the first SKU may be stored at multiple storage aisles 1402, multiple rack units 1430 within a storage aisle, and/or multiple mini-pallets 1440 within a rack unit. As a result, the retrieval of the first SKU together with different SKUs from various physical locations can be facilitated, while decreasing cost for replenishing the first SKU at these various physical locations in the storage area 1350.

In some embodiments, responsive to assigning a pick-cell cluster to a pick-cell station 1310, an aisle cluster to a storage aisle 1402, a rack cluster to a rack unit 1430, and/or a mini-pallet cluster to a mini-pallet 1440 in the SKU storing model, SKU management system 105 may provide instructions to AGVs to retrieve, replace, and/or move items corresponding to the SKUs within a storage area 1350 of a storage facility. Subsequently, the SKU management system 105 may instruct a picking-AGV 107, for example, to retrieve items from storage aisles 1402, rack units 1430, and/or mini-pallets 1440 using the SKU storing model to perform order fulfillment.

In some embodiments, the order volume of a SKU and the SKU affinities between various SKUs may dynamically change over time based on changing shopping behaviors of the customers. Therefore, in some embodiments, the cluster generator 202 may periodically (e.g., each 24 hours, each week, each month, etc.) re-compute the clustering using recent order data (e.g., order volume of SKUs over the previous 15 days). In some embodiments, the cluster location manager 204 may update the SKU storing model using the recomputed clusters and communicate with one or more AGVs to store items within the storage facility, as described below.

In some embodiments, the cluster generator 202 may compare cluster quality metrics (e.g., the cluster connectedness metric, the cluster similarity metric, the pair satisfiability metric, etc.) of the recomputed clusters and cluster quality metrics of the clusters currently implemented in the SKU storing model. In some embodiments, if the cluster generator 202 determines that the recomputed clusters provide better cluster quality metrics as compared to the currently implemented clusters (e.g., higher value of the cluster connectedness metric, lower value of the cluster similarity metric, and/or higher value of the pair satisfiability metric, etc.), the cluster location manager 204 may then update the SKU storing model using the recomputed clusters, thereby adjusting the assignment of customer orders to the pick-cell stations 1310 and reorganizing the SKUs within the storage area 1350 accordingly.

In some embodiments, SKUs associated with a storage facility may dynamically change over time, for example, some existing SKUs may be retired and no longer be stored in the storage area 1350, while new SKUs may be introduced and stored in the storage area 1350. In some embodiments, the cluster generator 202 may remove retired SKUs from further processing. In some embodiments, the newly introduced SKUs may have limited order volume and/or SKU affinities with other SKUs, due to limited order data, so the cluster generator 202 may filter the newly introduced SKUs from the processing cluster(s), based on their limited volume and/or data. Once one or more result clusters are generated from processing cluster(s), the cluster generator 202 may assign the newly introduced SKUs to a result cluster in the same way as non-clustering SKUs are assigned, for example, as discussed above.

Figure 9:
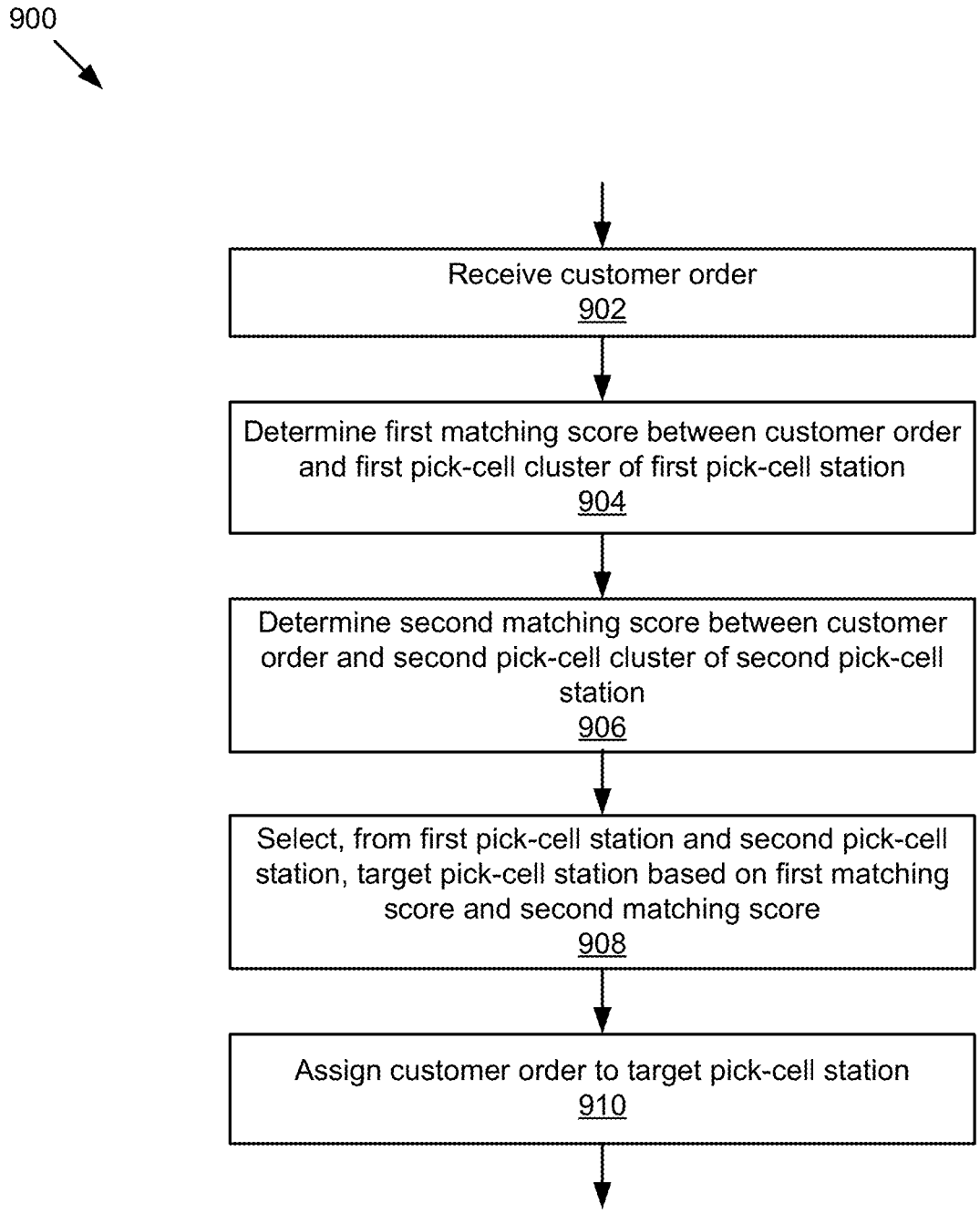
FIG. 9 is a flowchart of an example method for assigning customer orders to pick-cell stations.

FIG. 9 is a flowchart of an example method 900 for assigning the customer orders to the pick-cell stations 1310. In block 902, the picking task manager 206 may receive a customer order to be fulfilled, the customer order may include one or more ordered SKUs.

In block 904, the picking task manager 206 may determine a first matching score between the customer order and the first pick-cell cluster of the first pick-cell station 1310. For instance, the picking task manager 206 may then determine a target pick-cell station 1310 to assign the customer order among various pick-cell stations 1310 in the pick-tocarton area 1360. For example, the picking task manager 206 may determine a matching score between the customer order and pick-cell cluster of each pick-cell station 1310 (e.g., if the pick-to-carton area 1360 includes multiple pick-cell stations 1310). A first matching score may indicate the number of matching SKUs between the customer order and the first pick-cell cluster (e.g., 3 matching SKUs), for instance, each matching SKU may be present in the customer order and also present in the first pick-cell cluster of a first pick-cell station 1310. Similarly, in block 906, the picking task manager 206 may determine a second matching score between the customer order and a second pick-cell cluster of the second pick-cell station 1310 (e.g., 2 matching SKUs).

In some embodiments, the picking task manager 206 may select the target pick-cell station 1310 based on the matching score between the customer order and each pick-cell cluster. For example, in block 908, the picking task manager 206 may select a target pick-cell station 1310 from the first and second pick-cell stations 1310 based on the matching scores. For example, the picking task manager 206 may determine that the first matching score between the customer order and the first pick-cell cluster of the first pick-cell station 1310 (e.g., 3 matching SKUs) is higher than the second matching score between the customer order and the second pick-cell cluster of the second pick-cell station 1310 (e.g., 2 matching SKUs). Therefore, the picking task manager 206 may select the first pick-cell station 1310 to be the target pick-cell station to which to assign the customer order. In some embodiments, if the first matching score is equal to the second matching score, the picking task manager 206 may determine a SKU having the highest SKU velocity among the matching SKUs between the customer order and the first pick-cell cluster, and the matching SKUs between the customer order and the second pick-cell cluster. The picking task manager 206 may then determine the pick-cell cluster that includes the matching SKU having the highest SKU velocity (e.g., the second pick-cell cluster), and determine the pick-cell station associated with that pick-cell cluster to be the target pick-cell station (e.g., the second pick-cell station 1310).

In block 910, the picking task manager 206 may assign the customer order to the target pick-cell station to perform the order fulfillment. Assigning the customer orders to the pick-cell stations 1310 based on the pick-cell clusters associated with the pick-cell stations 1310 as discussed above is particularly advantageous, because the customer orders requesting the same ordered SKU(s) may be assigned to the same pick-cell station 1310. As a result, when a mini-pallet is retrieved and transported to the pick-cell station 1310, the SKUs stored in the mini-pallet can be used to fulfill multiple customer orders, thereby reducing the retrieval workloads of the picking-AGVs 107 and improving the order fulfillment efficiency.

Figure 10:
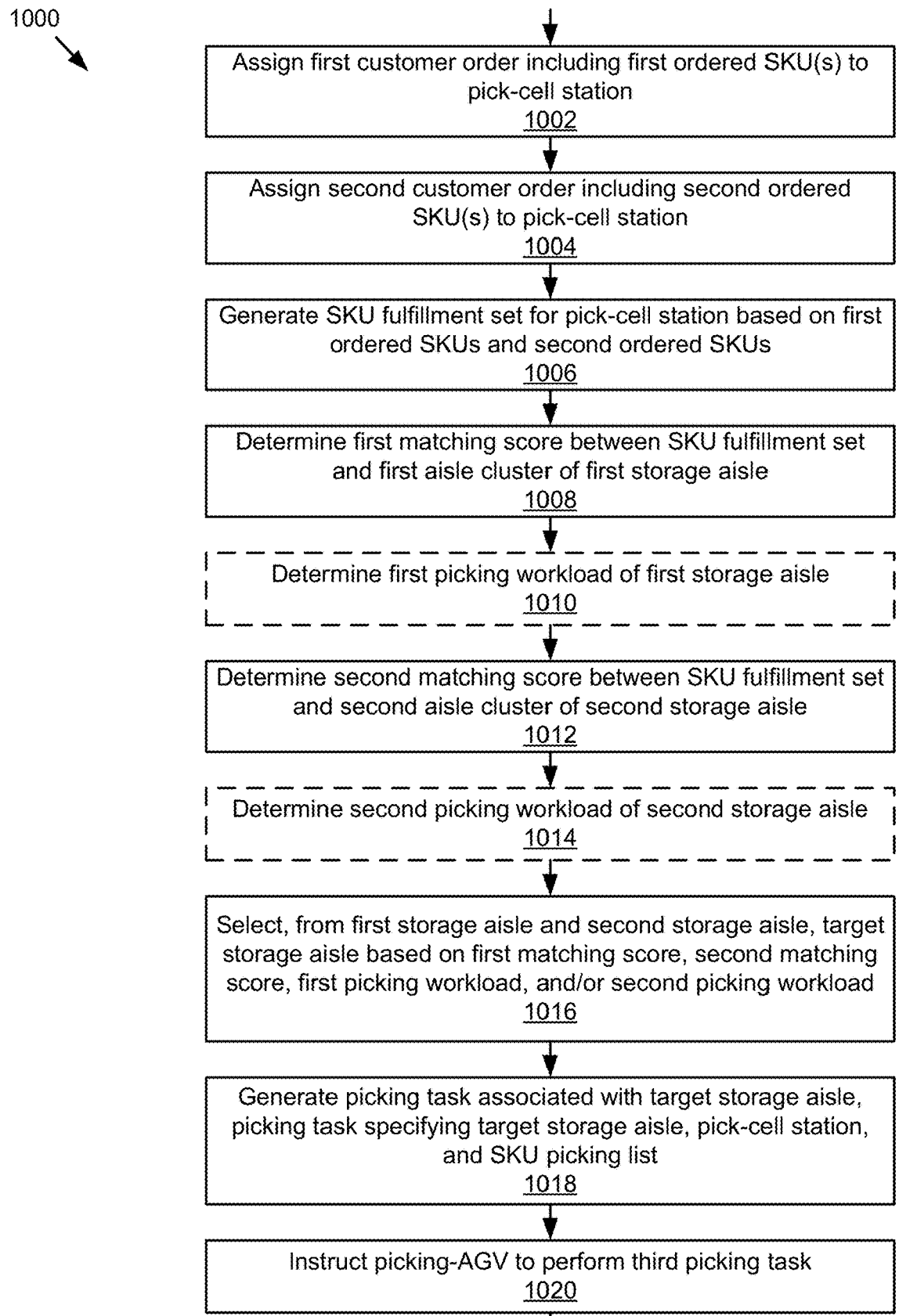
FIG. 10 is a flowchart of an example method for generating picking tasks to be performed by picking-AGVs.

FIG. 10 is a flowchart of an example method 1000 for generating the picking tasks to be performed by the picking-AGVs 107. In some embodiments, a picking task may cause a picking-AGV 107 to travel along a storage aisle 1402, retrieve one or more mini-pallets 1440 storing the SKUs in a SKU picking list from one or more rack units 1430 of the storage aisle 1402, and transport the retrieved mini-pallets 1440 to a pick-cell station 1310. In some embodiments, the SKU picking list may include the ordered SKUs of one or more customer orders assigned to the pick-cell station 1310.

In block 1002, the picking task manager 206 may assign a first customer order including one or more first SKUs (e.g., copy paper ABC, pen DEF, and staple GHJ) to a first pick-cell station 1310. In block 1004, the picking task manager 206 may assign a second customer order to the first pick-cell station 1310, the second customer order may include one or more second ordered SKUs (e.g., pen DEF, tape KLM, highlighter NOP, and ink QRS). In block 1006, the picking task manager 206 may generate a SKU fulfillment set for the first pick-cell station 1310, the SKU fulfillment set may include various ordered SKUs of the customer orders assigned to the first pick-cell station 1310. For example, the SKU fulfillment set of the first pick-cell station 1310 may include the first ordered SKUs of the first customer order and the second ordered SKUs of the second customer orders (e.g., copy paper ABC, pen DEF, staple GHJ, tape KLM, highlighter NOP, and ink QRS).

In some embodiments, the picking task manager 206 may determine a target storage aisle 1402 from which one or more ordered SKUs in the SKU fulfillment set can be retrieved. For instance, the picking task manager 206 may determine a matching score between the SKU fulfillment set and the aisle cluster of each storage aisle 1402, and determine a picking workload of each storage aisle 1402. For example, in block 1008, the picking task manager 206 may determine a first matching score between the SKU fulfillment set and the first aisle cluster of a first storage aisle 1402. The first matching score may indicate the number of matching SKUs between the SKU fulfillment set and the first aisle cluster (e.g., 4 matching SKUs), for instance, each matching SKU may be present in the SKU fulfillment set and also present in the first aisle cluster of the first storage aisle 1402. Thus, the first matching score may indicate the number of ordered SKUs in the SKU fulfillment set that are retrievable from the first storage aisle 1402, for example.

In block 1010, the picking task manager 206 may determine a first picking workload of the first storage aisle. For example, the first picking workload may indicate the number of picking tasks to be performed at the first storage aisles and not yet completed (e.g., 7 picking tasks). Similarly, in some embodiments, in block 1012, the picking task manager 206 may determine a second matching score between the SKU fulfillment set and the second aisle cluster of a second storage aisle 1402 (e.g., 3 matching SKUs). In some embodiments, in block 1014, the picking task manager 206 may determine a second picking workload of the second storage aisle (e.g., 2 picking tasks).

In block 1016, the picking task manager 206 may select a target storage aisle 1402 from, for example, the first storage aisle 1402 and the second storage aisle 1402 based on the first matching score and the second matching score. For example, the picking task manager 206 may determine that the first matching score between the SKU fulfillment set and the first aisle cluster of the first storage aisle 1402 (e.g., 4 matching SKUs) is higher than the second matching score between the SKU fulfillment set and the second aisle cluster of the second storage aisle 1402 (e.g., 3 matching SKUs). Therefore, the picking task manager 206 may determine that the first storage aisle 1402 stores more ordered SKUs of the SKU fulfillment set than the second storage aisle 1402, and thus select the first storage aisle 1402 to be the target storage aisle 1402. Because the ordered SKUs may be retrieved from the target storage aisle 1402 that stores more ordered SKUs of the SKU fulfillment set, the number of trips along various storage aisles of the picking-AGVs 107 to retrieve the ordered SKUs of the SKU fulfillment set can be reduced.

In some embodiments, the picking task manager 206 may additionally or alternatively select the target storage aisle based on the picking workloads of the storage aisles 1402. In some embodiments, the picking task manager 206 may determine a ratio between the matching score and the picking workload for each storage aisle 1402, and determine the target storage aisle 1402 based on the ratios of the storage aisles 1402. For example, the picking task manager 206 may determine the first ratio between the matching score and the picking workload of the first storage aisle 1402 to be 4/7, and determine the second ratio between the matching score and the picking workload of the second storage aisle 1402 to be 3/2. The picking task manager 206 may then determine that the second ratio of the second storage aisle 1402 is higher than the first ratio of the first storage aisle 1402, and thus select the second storage aisle 1402 to be the target storage aisle 1402. In this example, although the second storage aisle 1402 stores fewer ordered SKUs of the SKU fulfillment set (e.g., 3 matching SKUs) than the first storage aisle 1402 (e.g., 4 matching SKUs), the second storage aisle 1402 may still be selected as the target storage aisle based on a lower picking workload (e.g., each factor may be weighted). Thus, because the ordered SKUs in the SKU fulfillment set may be stored in multiple storage aisles 1402 as a result of the SKU replication, the picking tasks may be advantageously assigned across multiple storage aisles 1402 in a balanced manner, thereby avoiding the bottleneck situation caused by assigning multiple picking tasks to the same storage aisle 1402.

In block 1018, the picking task manager 206 may generate a picking task associated with the target storage aisle 1402. In some embodiments, the picking task may specify a SKU picking list including the ordered SKU(s) to be retrieved, the target storage aisle 1402 from which these ordered SKU(s) are retrieved, and the first pick-cell station 1310 to which these ordered SKU(s) are transported. In some embodiments, the picking task manager 206 may determine matching SKUs between the SKU fulfillment set and the aisle cluster of the target storage aisle 1402, and include the matching SKUs in the SKU picking list as the ordered SKUs to be retrieved. Thus, the SKU picking list may indicate the ordered SKUs of the SKU fulfillment set (whether ordered in the same or separate customer orders) that are retrievable from the target storage aisle 1402. Continuing the above example, the picking task manager 206 may determine that the target storage aisle 1402 is the first storage aisle 1402, and determine that the SKU picking list to be retrieved from the first storage aisle 1402 includes copy paper ABC, pen DEF, tape KLM, and ink QRS. Thus, in this example, one retrieval of the pen DEF from the first storage aisle 1402 can contribute to the fulfillment of both a first customer order and a second customer order assigned to the first pick-cell station 1310. In block 1020, the picking task manager 206 may instruct a picking-AGV 107 to perform the generated picking task. For example, the picking task manager 206 may instruct the picking-AGV 107 to retrieve the mini-pallets 1440 storing copy paper ABC, pen DEF, tape KLM, and ink QRS from the first storage aisle 1402, and bring these mini-pallets 1440 to the first pick-cell station 1310.

Figure 11:
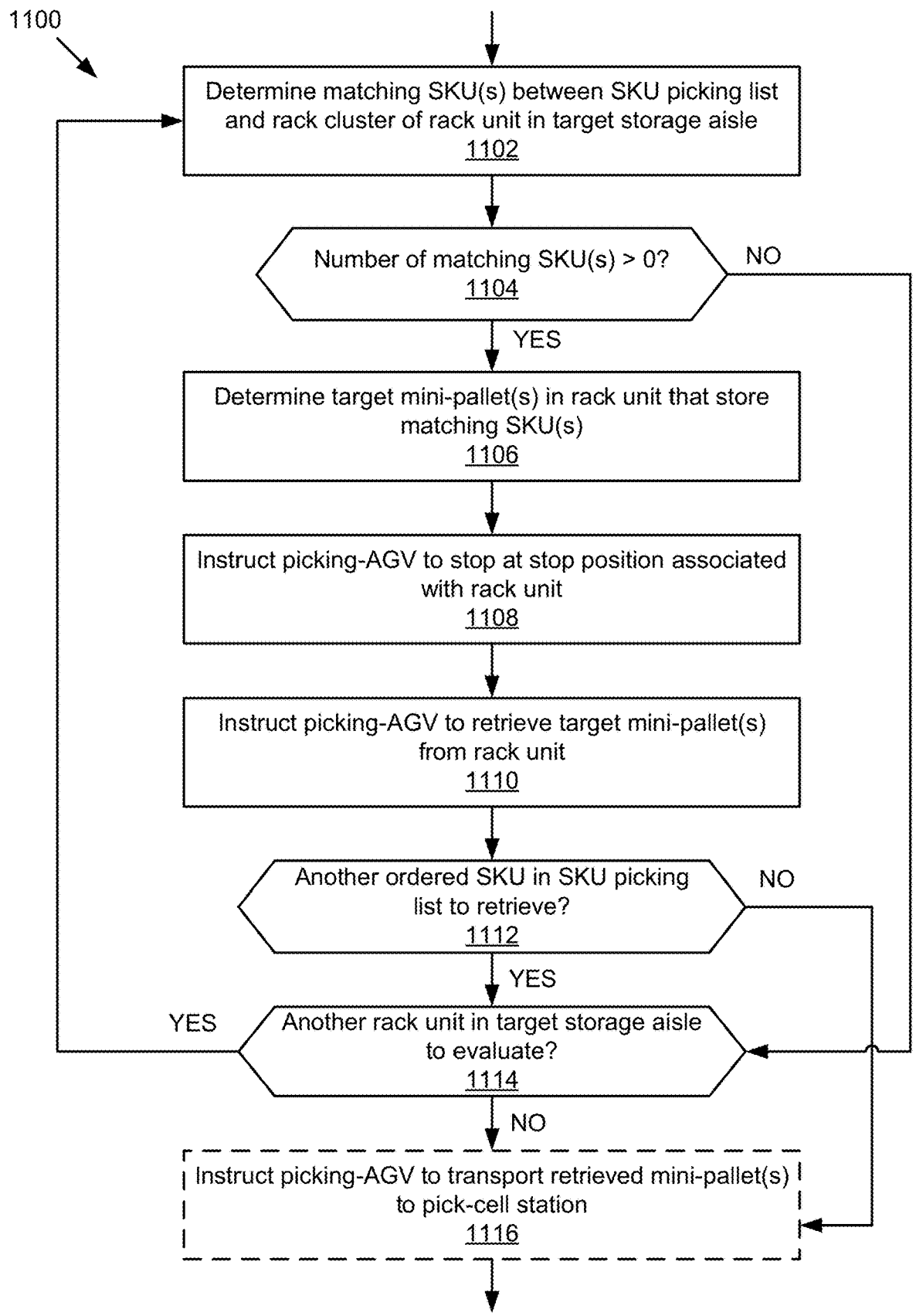
FIG. 11 is a flowchart of an example method for instructing the picking-AGV to perform a picking task.

FIG. 11 is a flowchart of an example method 1100 for instructing the picking-AGV 107 to perform a picking task. In block 1102, the picking task manager 206 may determine one or more matching SKUs between the SKU picking list and a first rack cluster of a first rack unit 1430 among various rack units 1430 of a target storage aisle 1402 (or multiple storage aisles 1402, depending on the embodiment). For instance, the picking task manager 206 may determine which SKUs exist in both the picking list and the first rack cluster. In block 1104, the picking task manager 206 may determine whether the number of matching SKUs between the SKU picking list and the first rack cluster of the first rack unit 1430 is higher than 0. If in block 1104, the picking task manager 206 determines that the number of matching SKUs between the SKU picking list and the first rack cluster of the first rack unit 1430 is not higher than 0, the picking task manager 206 may determine that the first rack unit 1430 does not store the ordered SKU(s) to be retrieved in the SKU picking list, in response to which, the method 1100 may proceed to block 1112, at which the picking task manager 206 may determine whether there is another rack unit 1430 in the target storage aisle 1402 to evaluate.

In some embodiments, if, in block 1104, the picking task manager 206 determines that the number of matching SKUs between the SKU picking list and the first rack cluster of the first rack unit 1430 is higher than 0, the picking task manager 206 may determine that these one or more matching SKUs are the ordered SKU(s) in the SKU picking list to be retrieved from the first rack unit 1430. Continuing the above example, the picking task manager 206 may determine that, among the ordered SKUs in the SKU picking list, the matching SKUs to be retrieved from the first rack unit 1430 of the target storage aisle 1402 include copy paper ABC, tape KLM, and ink QRS.

In block 1106, the picking task manager 206 may determine, from among various mini-pallets 1440 of the first rack unit 1430, one or more target mini-pallets 1440 that store the one or more matching SKUs. In some embodiments, the target mini-pallet(s) 1440 may have at least one matching SKU present in their mini-pallet clusters. If the matching SKU9s0 are stored in multiple mini-pallets 1440 of the first rack unit 1430, the picking task manager 206 may select the target mini-pallet 1440 that stores the first matching SKU and also stores other matching SKU(s) to be retrieved, thereby reducing the retrieval of mini-pallets to be performed by the picking-AGV 107. For example, the picking task manager 206 may determine that the target mini-pallets 1440 to be retrieved from the first rack unit 1430 includes a first target mini-pallet 1440 that stores copy paper ABC and ink QRS, and a second target mini-pallet 1440 that stores tape KLM. The first target mini-pallet 1440 and the second target mini-pallet 1440 may also store other SKUs in their other compartments, depending on the implementation of the mini-pallet 1440.

In block 1108, the picking task manager 206 may instruct the picking-AGV 107 to stop at a stop position associated with the first rack unit 1430. As depicted in FIG. 15, each rack unit 1430 of the target storage aisle 1402 may be associated with a stop position 1530 from which the mini-pallets 1440 in the rack unit 1430 can be retrieved in one stop of the picking-AGV 107. In some embodiments, when the picking-AGV 107 makes a stop at the stop position associated with the first rack unit 1430, in block 1110, the picking task manager 206 may instruct the picking-AGV 107 to retrieve the one or more target mini-pallets from the first rack unit 1430 during that stop. For example, the picking task manager 206 may instruct the picking-AGV 107 to retrieve the first target mini-pallet 1440 that stores copy paper ABC and ink QRS, and the second target mini-pallet 1440 that stores tape KLM from the first rack unit 1430. The picking-AGV 107 may then place these target mini-pallet 1440 on its mini-pallet holder (e.g., the AGV shelf) for transportation.

Once the target mini-pallet(s) 1440 storing the matching SKUs in the first rack unit 1430 are retrieved, in block 1112, the picking task manager 206 may determine whether there is another ordered SKU in the SKU picking list to retrieve. If, in block 1112, the picking task manager 206 determines that the SKU picking list does not include another ordered SKU to be retrieved, the method 1100 may proceed to block 1116, at which the picking task manager 206 may instruct the picking-AGV 107 to transport the retrieved target mini-pallet(s) 1440 on its mini-pallet holder back to the first pick-cell station 1310.

If, in block 1112, the picking task manager 206 determines that the SKU picking list includes another ordered SKU to be retrieved, the picking task manager 206 may determine to retrieve the additional SKU from another rack unit 1430 of the target storage aisle 1402. For example, the picking task manager 206 may determine that the picking-AGV 107 needs to navigate to another rack unit 1430 of the first storage aisle 1402 to retrieve the pen DEF in the SKU picking list.

The method 1100 may proceed to block 1114, at which the picking task manager 206 may determine whether there is another rack unit 1430 in the target storage aisle 1402 to evaluate. In some embodiments, the picking task manager 206 may evaluate the rack units 1430 of the target storage aisle 1402 in the increasing order of the relative distance between the rack unit 1430 and the front end of the target storage aisle 1402. As discussed elsewhere herein, the front end of the target storage aisle 1402 may be the end position of the target storage aisle 1402 with the lowest distance to the pick-to-carton area 1360 in its traffic direction.

If, in block 1114, the picking task manager 206 determines that the target storage aisle 1402 includes another rack unit 1430 to evaluate, the method 1100 may then proceed to block 1102 to determine for the next rack unit 1430, for example. If, in block 1114, the picking task manager 206 determines that the target storage aisle 1402 does not include another rack unit 1430 to evaluate, the method 1100 may proceed to block 1116 and, as discussed elsewhere herein, in block 1116, the picking task manager 206 may instruct the picking-AGV 107 to transport the retrieved target mini-pallet(s) 1440 on its mini-pallet holder back to the first pick-cell station 1310.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
initializing a stock keeping unit ("SKU") storing model of a storage facility, the SKU storing model including a first pick-cell station and a second pick-cell station at which one or more customer orders are fulfilled, the SKU storing model including one or more storage aisles;
determining, from SKUs associated with the storage facility, a first set of SKUs based on order volumes of one or more SKUs in the first set of SKUs;
dividing the first set of SKUs into a first cluster and a second cluster based on SKU affinities between the one or more SKUs in the first set of SKUs;
replicating a first SKU of the first cluster to the second cluster based on a demand correlation between the first SKU of the first cluster and a second SKU of the second cluster;
responsive to replicating the first SKU of the first cluster to the second cluster, determining the first cluster to be a first pick-cell cluster and determining the second cluster to be a second pick-cell cluster;
assigning the first pick-cell cluster to the first pick-cell station and assigning the second pick-cell cluster to the second pick-cell station in the SKU storing model;
clustering the SKUs associated with the storage facility into one or more aisle clusters;
assigning an aisle cluster to a corresponding storage aisle in the SKU storing model based on the aisle cluster, the first pick-cell cluster, and the second pick-cell cluster; and
instructing an automated guided vehicle to perform a task using the assignment of one or more of the aisle cluster, the first cluster, and the second cluster.

2. The method of claim 1, further comprising:
receiving a customer order;
determining a first matching score between the customer order and the first pick-cell cluster of the first pick-cell station;
determining a second matching score between the customer order and the second pick-cell cluster of the second pick-cell station;
selecting, from the first pick-cell station and the second pick-cell station, a target pick-cell station based on the first matching score and the second matching score; and
assigning the customer order to the target pick-cell station to fulfill the customer order.

3. The method of claim 1, wherein assigning the aisle cluster to the corresponding storage aisle in the SKU storing model includes:
determining a matching score between the aisle cluster and the first pick-cell cluster;
determining that the matching score between the aisle cluster and the first pick-cell cluster satisfies a defined threshold matching score;
responsive to determining that the matching score between the aisle cluster and the first pick-cell cluster satisfies the defined threshold matching score, determining the corresponding storage aisle from the one or more storage aisles based on a relative distance between the corresponding storage aisle and the first pick-cell station; and
assigning the aisle cluster to the corresponding storage aisle in the SKU storing model.

4. The method of claim 1, wherein the corresponding storage aisle includes one or more rack units, and the method includes:
clustering SKUs of the aisle cluster into one or more rack clusters; and
assigning a rack cluster to a corresponding rack unit of the corresponding storage aisle in the SKU storing model.

5. The method of claim 4, wherein assigning the rack cluster to the corresponding rack unit of the corresponding storage aisle in the SKU storing model includes:
determining a demand score for each rack cluster based on SKU velocities of SKUs in the rack cluster;
ranking the one or more rack clusters based on the demand scores of the one or more rack clusters; and
assigning the one or more rack clusters to the one or more rack units of the corresponding storage aisle based on ranking orders of the one or more rack clusters.

6. The method of claim 4, wherein the corresponding rack unit of the corresponding storage aisle includes one or more mini-pallets, and the method includes:
clustering SKUs of the rack cluster into one or more mini-pallet clusters; and
assigning a mini-pallet cluster to a corresponding mini-pallet of the corresponding rack unit in the SKU storing model.

7. The method of claim 1, wherein the SKU storing model includes a first storage aisle associated with a first aisle cluster and a second storage aisle associated with a second aisle cluster, and the method includes:
assigning a first customer order to the first pick-cell station, the first customer order including one or more first ordered SKUs;
assigning a second customer order to the first pick-cell station, the second customer order including one or more second ordered SKUs;
generating a SKU fulfillment set for the first pick-cell station, the SKU fulfillment set including the one or more first ordered SKUs of the first customer order and the one or more second ordered SKUs of the second customer order;
determining a first matching score between the SKU fulfillment set and the first aisle cluster of the first storage aisle;
determining a second matching score between the SKU fulfillment set and the second aisle cluster of the second storage aisle;
selecting, from the first storage aisle and the second storage aisle, a target storage aisle based on the first matching score and the second matching score;
generating a picking task associated with the target storage aisle, the picking task specifying the target storage aisle, the first pick-cell station, and a SKU picking list; and
instructing a picking-automated guided vehicle (picking-AGV) to perform the picking task.

8. The method of claim 7, wherein the method further comprises:
determining a first picking workload of the first storage aisle; and determining a second picking workload of the second storage aisle; and selecting the target storage aisle includes selecting, from the first storage aisle and the second storage aisle, the target storage aisle based on the first picking workload of the first storage aisle and the second picking workload of the second storage aisle.

9. The method of claim 7, further comprising:

determining one or more matching SKUs between the SKU picking list and a first rack cluster of a first rack unit in the target storage aisle;

determining one or more target mini-pallets in the first rack unit, the one or more target mini-pallets storing the one or more matching SKUs;

instructing the picking-AGV to stop at a stop position associated with the first rack unit; and instructing the picking-AGV to retrieve the one or more target mini-pallets storing the one or more matching SKUs from the first rack unit during a stop at the stop position.

10. A system comprising:

one or more processors; and a memory storing instructions that, when executed by the one or more processors, cause the system to:

initialize a stock keeping unit ("SKU") storing model of a storage facility, the SKU storing model including a first pick-cell station and a second pick-cell station at which one or more customer orders are fulfilled, the SKU storing model including one or more storage aisles;

determine, from SKUs associated with the storage facility, a first set of SKUs based on order volumes of one or more SKUs in the first set of SKUs;

divide the first set of SKUs into a first cluster and a second cluster based on SKU affinities between the one or more SKUs in the first set of SKUs;

replicate a first SKU of the first cluster to the second cluster based on a demand correlation between the first SKU of the first cluster and a second SKU of the second cluster;

responsive to replicating the first SKU of the first cluster to the second cluster, determine the first cluster to be a first pick-cell cluster and determining the second cluster to be a second pick-cell cluster;

assign the first pick-cell cluster to the first pick-cell station and assigning the second pick-cell cluster to the second pick-cell station in the SKU storing model;

cluster the SKUs associated with the storage facility into one or more aisle clusters;

assign an aisle cluster to a corresponding storage aisle in the SKU storing model based on the aisle cluster, the first pick-cell cluster, and the second pick-cell cluster; and instruct an automated guided vehicle to perform a task using the assignment of one or more of the aisle cluster, the first cluster, and the second cluster.

11. The system of claim 10, wherein the instructions, when executed by the one or more processors, further cause the system to:

receive a customer order;

determine a first matching score between the customer order and the first pick-cell cluster of the first pick-cell station;

determine a second matching score between the customer order and the second pick-cell cluster of the second pick-cell station;

select, from the first pick-cell station and the second pick-cell station, a target pick-cell station based on the first matching score and the second matching score; and assign the customer order to the target pick-cell station to fulfill the customer order.

12. The system of claim 10, wherein assigning the aisle cluster to the corresponding storage aisle in the SKU storing model includes:

determining a matching score between the aisle cluster and the first pick-cell cluster;

determining that the matching score between the aisle cluster and the first pick-cell cluster satisfies a defined threshold matching score;

responsive to determining that the matching score between the aisle cluster and the first pick-cell cluster satisfies the defined threshold matching score, determining the corresponding storage aisle from the one or more storage aisles based on a relative distance between the corresponding storage aisle and the first pick-cell station; and assigning the aisle cluster to the corresponding storage aisle in the SKU storing model.

13. The system of claim 10, wherein:

the corresponding storage aisle includes one or more rack units; and the instructions further cause the system to:

cluster SKUs of the aisle cluster into one or more rack clusters; and assign a rack cluster to a corresponding rack unit of the corresponding storage aisle in the SKU storing model.

14. The system of claim 13, wherein assigning the rack cluster to the corresponding rack unit of the corresponding storage aisle in the SKU storing model includes:

determining a demand score for each rack cluster based on SKU velocities of SKUs in the rack cluster;

ranking the one or more rack clusters based on the demand scores of the one or more rack clusters; and assigning the one or more rack clusters to the one or more rack units of the corresponding storage aisle based on ranking orders of the one or more rack clusters.

15. The system of claim 13, wherein:

the corresponding rack unit of the corresponding storage aisle includes one or more mini pallets; and the instructions further cause the system to:

cluster SKUs of the rack cluster into one or more mini-pallet clusters; and assign a mini-pallet cluster to a corresponding mini-pallet of the corresponding rack unit in the SKU storing model.

16. The system of claim 10, wherein:

the SKU storing model includes a first storage aisle associated with a first aisle cluster and a second storage aisle associated with a second aisle cluster; and the instructions further cause the system to:

assign a first customer order to the first pick-cell station, the first customer order including one or more first ordered SKUs;

assign a second customer order to the first pick-cell station, the second customer order including one or more second ordered SKUs;

generate a SKU fulfillment set for the first pick-cell station, the SKU fulfillment set including the one or more first ordered SKUs of the first customer order and the one or more second ordered SKUs of the second customer order;

determine a first matching score between the SKU fulfillment set and the first aisle cluster of the first storage aisle;

determine a second matching score between the SKU fulfillment set and the second aisle cluster of the second storage aisle;

select, from the first storage aisle and the second storage aisle, a target storage aisle based on the first matching score and the second matching score;

generate a picking task associated with the target storage aisle, the picking task specifying the target storage aisle, the first pick-cell station, and a SKU picking list; and instruct a picking-automated guided vehicle (picking-AGV) to perform the picking task.

17. The system of claim 16, wherein:

the instructions, when executed by the one or more processors, further cause the system to:

determine a first picking workload of the first storage aisle; and determine a second picking workload of the second storage aisle; and selecting the target storage aisle includes selecting, from the first storage aisle and the second storage aisle, the target storage aisle based on the first picking workload of the first storage aisle and the second picking workload of the second storage aisle.

18. A system comprising:

means for initializing a stock keeping unit ("SKU") storing model of a storage facility, the SKU storing model including a first pick-cell station and a second pick-cell station at which one or more customer orders are fulfilled, the SKU storing model including one or more storage aisles;

means for determining, from SKUs associated with the storage facility, a first set of SKUs based on order volumes of one or more SKUs in the first set of SKUs;

means for dividing the first set of SKUs into a first cluster and a second cluster based on SKU affinities between the one or more SKUs in the first set of SKUs;

means for replicating a first SKU of the first cluster to the second cluster based on a demand correlation between the first SKU of the first cluster and a second SKU of the second cluster;

means for, responsive to replicating the first SKU of the first cluster to the second cluster, determining the first cluster to be a first pick-cell cluster and determining the second cluster to be a second pick-cell cluster;

means for assigning the first pick-cell cluster to the first pick-cell station and assigning the second pick-cell cluster to the second pick-cell station in the SKU storing model;

means for clustering the SKUs associated with the storage facility into one or more aisle clusters;

means for assigning an aisle cluster to a corresponding storage aisle in the SKU storing model based on the aisle cluster, the first pick-cell cluster, and the second pick-cell cluster; and means for instructing an automated guided vehicle to perform a task using the assignment of one or more of the aisle cluster, the first cluster, and the second cluster.

19. A method comprising:

initializing a stock keeping unit ("SKU") storing model of a storage facility, the SKU storing model including a first pick-cell station and a second pick-cell station at which one or more customer orders are fulfilled;

determining, from SKUs associated with the storage facility, a first set of SKUs based on order volumes of one or more SKUs in the first set of SKUs;

dividing the first set of SKUs into a first cluster and a second cluster based on SKU affinities between the one or more SKUs in the first set of SKUs;

replicating a first SKU of the first cluster to the second cluster based on a demand correlation between the first SKU of the first cluster and a second SKU of the second cluster;

responsive to replicating the first SKU of the first cluster to the second cluster, determining the first cluster to be a first pick-cell cluster and determining the second cluster to be a second pick-cell cluster;

assigning the first pick-cell cluster to the first pick-cell station and assigning the second pick-cell cluster to the second pick-cell station in the SKU storing model;

receiving a customer order;

determining a first matching score between the customer order and the first pick-cell cluster of the first pick-cell station;

determining a second matching score between the customer order and the second pick-cell cluster of the second pick-cell station;

selecting, from the first pick-cell station and the second pick-cell station, a target pick-cell station based on the first matching score and the second matching score;

assigning the customer order to the target pick-cell station to fulfill the customer order; and instructing an automated guided vehicle to perform a task using the assignment of the customer order to the target pick-cell station.

20. A method comprising:

initializing a stock keeping unit ("SKU") storing model of a storage facility, the SKU storing model including a first pick-cell station and a second pick-cell station at which one or more customer orders are fulfilled, the SKU storing model including a first storage aisle associated with a first aisle cluster and a second storage aisle associated with a second aisle cluster;

determining, from SKUs associated with the storage facility, a first set of SKUs based on order volumes of one or more SKUs in the first set of SKUs;

dividing the first set of SKUs into a first cluster and a second cluster based on SKU affinities between the one or more SKUs in the first set of SKUs;

replicating a first SKU of the first cluster to the second cluster based on a demand correlation between the first SKU of the first cluster and a second SKU of the second cluster;

responsive to replicating the first SKU of the first cluster to the second cluster, determining the first cluster to be a first pick-cell cluster and determining the second cluster to be a second pick-cell cluster;

assigning the first pick-cell cluster to the first pick-cell station and assigning the second pick-cell cluster to the second pick-cell station in the SKU storing model;

assigning a first customer order to the first pick-cell station, the first customer order including one or more first ordered SKUs;

assigning a second customer order to the first pick-cell station, the second customer order including one or more second ordered SKUs;

generating a SKU fulfillment set for the first pick-cell station, the SKU fulfillment set including the one or more first ordered SKUs of the first customer order and the one or more second ordered SKUs of the second customer order;

determining a first matching score between the SKU fulfillment set and the first aisle cluster of the first storage aisle;

determining a second matching score between the SKU fulfillment set and the second aisle cluster of the second storage aisle;

selecting, from the first storage aisle and the second storage aisle, a target storage aisle based on the first matching score and the second matching score;

generating a picking task associated with the target storage aisle, the picking task specifying the target storage aisle, the first pick-cell station, and a SKU picking list; and instructing a picking-automated guided vehicle (picking-AGV) to perform the picking task.

\* \* \* \* \*